(12) United States Patent
Suzuki

(10) Patent No.: US 6,389,238 B1
(45) Date of Patent: *May 14, 2002

(54) LENS BARREL

(75) Inventor: Hiroaki Suzuki, Saitama (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/534,285

(22) Filed: Mar. 23, 2000

(30) Foreign Application Priority Data

Mar. 24, 1999 (JP) .............................. 11-079230

(51) Int. Cl.[7] ...................... G03B 11/04; G03B 11/00; G02B 3/00; G02B 7/02; G02B 7/00
(52) U.S. Cl. ...................... 396/534; 396/544; 359/723; 359/827; 359/892
(58) Field of Search ................. 396/534, 544; 359/722, 723, 827, 885, 892

(56) References Cited

U.S. PATENT DOCUMENTS

| | | | | |
|---|---|---|---|---|
| 4,909,617 A | * | 3/1990 | Boyd | 359/511 |
| 5,105,312 A | * | 4/1992 | Tiffen et al. | 359/892 |
| 5,227,825 A | | 7/1993 | Eguchi et al. | 396/534 |
| 5,294,954 A | | 3/1994 | Nomura et al. | 396/448 |
| 5,327,188 A | * | 7/1994 | Kohmoto | 396/103 |
| 6,104,887 A | * | 8/2000 | Hamasaki et al. | 396/534 |

* cited by examiner

Primary Examiner—David M. Gray
Assistant Examiner—Rochelle Blackman
(74) Attorney, Agent, or Firm—Greenblum & Bernstein, P.L.C.

(57) ABSTRACT

A lens barrel includes an outer barrel including a lens-hood mount portion at the front end of the outer barrel, a lens hood being detachably attached to the lens-hood mount portion; an inner barrel including a filter mount portion at the front end of the inner barrel and positioned inside the outer barrel to be rotatable about an optical axis relative to the outer barrel; and a manually rotatable structure adopted to rotate the inner barrel from the outside of the outer barrel.

27 Claims, 23 Drawing Sheets

LENS BARREL

BACKGROUND OF THE INVENTION

1. Field of the Invention

The present invention relates to a lens barrel to which a lens hood can be detachably attached at the front end of the lens barrel.

2. Description of the Related Art

A circular polarizing filter is used over a camera lens to eliminate specular reflection from the surface of objects (e.g. the surface of a glass or the surface of water), or to emphasize the color of the blue sky when using color film. A typical circular polarizing filter (i.e., a screw-setting circular polarizing filter which screws directly onto the front of the lens barrel), which is available on the market, is provided with a mount ring having a male thread portion which is screw-engaged with a female thread portion (accessory mount portion) formed at the front end of a lens barrel, a rotatable filter ring which is rotatably fitted in and supported by the mount ring, and a circular polarizing filter fixedly supported by the rotatable filter ring. When the circular polarizing filter is used, the rotatable filter ring is manually rotated relative to the mount ring with the mount ring being fixed to the front end of the lens barrel.

It is formerly troublesome to use such a circular polarizing filter together with a lens hood. This is because firstly, the rotatable filter ring needs to be rotated to adjust the angle of rotation of the filter without the lens hood being attached to the lens barrel and thereafter the lens hood is attached to the lens barrel to provide a photo-ready condition.

SUMMARY OF THE INVENTION

The primary object of the present invention is to provide a lens barrel having a structure which makes it possible to allow the user to rotate the filter even with the lens hood being attached to the lens barrel.

To achieve the object mentioned above, according to an aspect of the present invention, a lens barrel is provided which includes an outer barrel including a lens-hood mount portion at the front end of the outer barrel, a lens hood being detachably attached to the lens-hood mount portion; an inner barrel including a filter mount portion at the front end of the inner barrel and positioned inside the outer barrel to be rotatable about an optical axis relative to the outer barrel; and a manually rotating structure adopted to rotate the inner barrel from the outside of the outer barrel.

With this arrangement, at least two barrels (outer barrel and inner barrel) are provided for attaching the lens-hood and the filter thereto, and the inner barrel which includes the filter mount portion is adopted to rotate from the outside of the outer barrel. Accordingly, a filter which is attached to the front end of the inner barrel can be easily rotated even with a lens hood attached to outer barrel, which facilitates the handling of the lens barrel.

Preferably, the manually rotatable structure includes an operational opening formed on the outer barrel to radially expose part of an outer peripheral surface of the inner barrel through the operational opening.

In an embodiment, the exposed part of the outer peripheral surface of the inner barrel is knurled.

In an embodiment, the manually rotatable structure further includes an operational roller which is rotatably supported by an axial shaft supported by the outer barrel so that an outer peripheral surface of the roller contacts an outer peripheral surface of the inner barrel, the operational roller being operated from the outside of the outer barrel. In this arrangement, it is preferable that the manually rotatable structure includes an operational opening formed on the outer barrel and the operational roller is positioned in the operational opening.

Preferably, at least an outer peripheral surface of the operational roller is made of a friction-enhancing material. For example the friction-enhancing material can be made of rubber.

Furthermore, the axial shaft which rotatably supports the operational roller can be made of a resilient material such as spring steel, so that the operational roller is movable between a transmission position wherein the outer peripheral surface of the operational roller contacts the outer peripheral surface of the inner barrel, and a nontransmission position wherein the outer peripheral surface of the operational roller is separated from the outer peripheral surface of the inner barrel.

In addition to the outer barrel and the inner barrel, a middle barrel positioned between the outer barrel and the inner barrel can be also provided so as to be rotatable about the optical axis relative to the outer barrel. In this arrangement, the manually rotatable structure includes an operational opening formed on the outer barrel to radially expose part of an outer peripheral surface of the middle barrel through the operational opening, and a rotation transmitting device for transmitting rotation of the middle barrel to the inner barrel.

Preferably, the middle barrel is supported between the outer barrel and the inner barrel to be immovable in the direction of the optical axis relative to the outer barrel.

In an embodiment, the rotation transmitting device includes at least one linear guide groove formed on an inner peripheral surface of the middle barrel to extend in the direction of the optical axis; and at least one corresponding projection projecting radially from an outer peripheral surface of the inner barrel to be fitted in the at least one linear guide groove.

Similar to the above-described embodiments, it is preferable to provide a mechanism for easily rotating the middle barrel from the outside of the outer barrel. For instance, the exposed part of the outer peripheral surface of the middle barrel is knurled. Alternatively, an operational roller rotatably supported by the outer barrel can be provided, so that an outer peripheral surface the roller contacts; an outer peripheral surface of the middle barrel.

In the latter instance, the operational roller can be positioned in the operational opening. Furthermore, at least an outer peripheral surface of the operational roller can be made of a friction-enhancing material, such as rubber. The operational roller can be supported by an axial shaft which is made of a resilient material (e.g., spring steel), so that the operational roller is movable between a transmission position wherein the outer peripheral surface of the operational roller contacts the outer peripheral surface of the middle barrel, and a non-transmission position wherein the outer peripheral surface of the operational roller is separated from the outer peripheral surface of the middle barrel.

In an embodiment, a lock mechanism is also provided which locks the inner barrel so as not to rotate about the optical axis relative to the outer barrel. The lock mechanism facilitates attachment of a filter to the filter mount portion of the inner barrel.

Preferably, the lock mechanism includes a female screw hole formed on the outer barrel and a lock screw nut screwed in the female screw hole.

Preferably, the filter mount portion includes a female threaded portion on which a male thread portion formed on a filter mount ring is screwed.

Preferably, either a polarizing filter or a circular polarizing filter is attached to the filter mount portion.

In an embodiment, the lens barrel further includes a stationary barrel which is fixedly attached to a body of an optical instrument, and a movable barrel fitted in the stationary barrel so that the movable barrel is movable along the optical axis relative to the stationary barrel. The outer barrel can be formed integral with either the stationary barrel or the movable barrel.

According to another aspect of the present invention, a lens barrel is provided which includes an outer barrel to which a lens hood is detachably attached at the front end thereof; a rotatable barrel including a filter mount portion at the front end thereof and positioned inside the outer barrel to be rotatable about an optical axis relative to the outer barrel; and an operational opening formed on the outer barrel to radially expose part of an outer peripheral surface of the rotatable barrel through the operational opening, so that rotating force is applied to the rotatable barrel through the opening by the user.

The present disclosure relates to subject matter contained in Japanese Patent Application No. 11-079230 (filed on Mar. 24, 1999) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENTS

Figure 1:
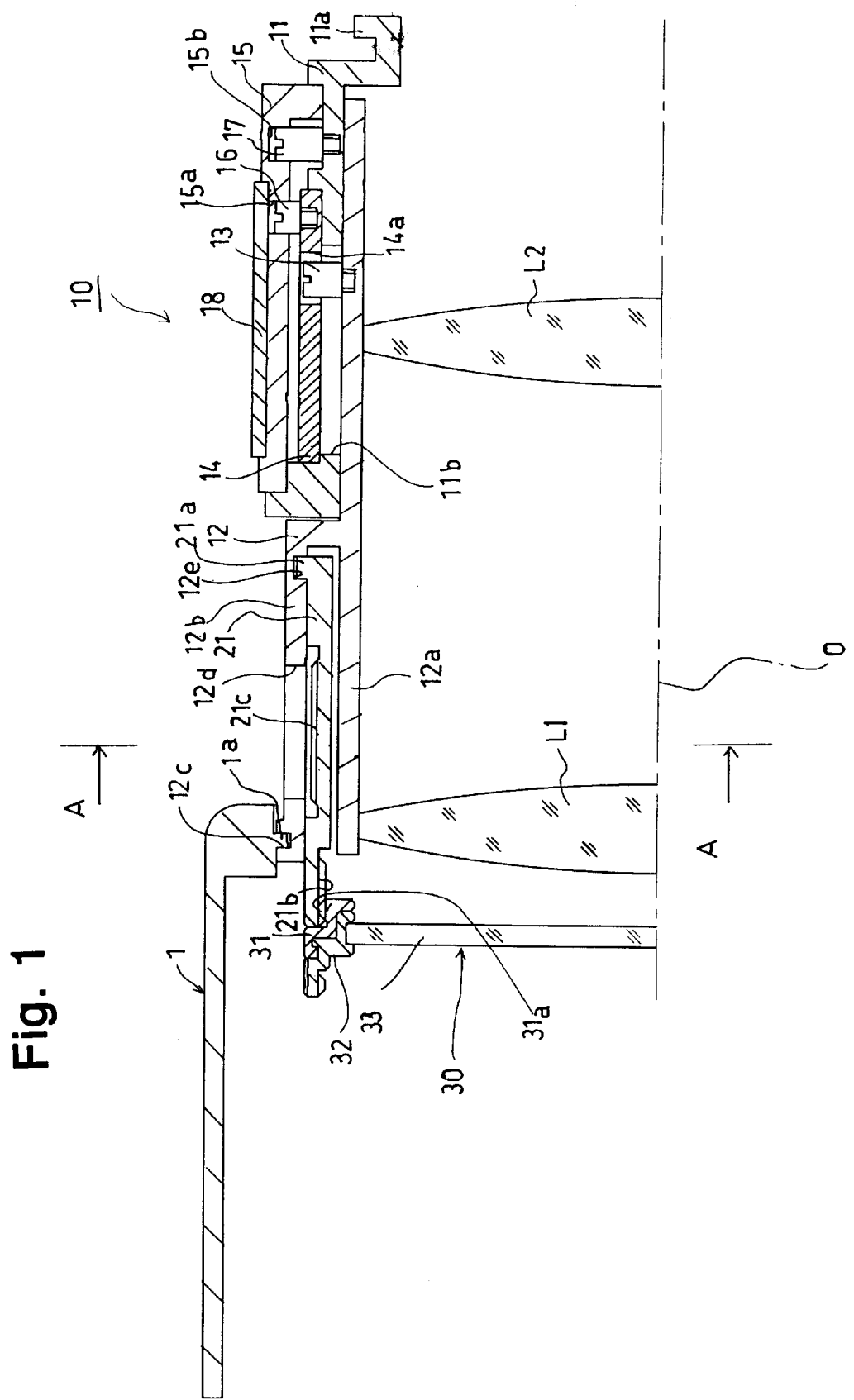
FIG. 1 is a cross-sectional view of the first embodiment of a lens barrel to which the present invention is applied, in a state where the focal point is set at infinity, showing an upper half of the lens barrel from the optical axis thereof.
Figure 2:
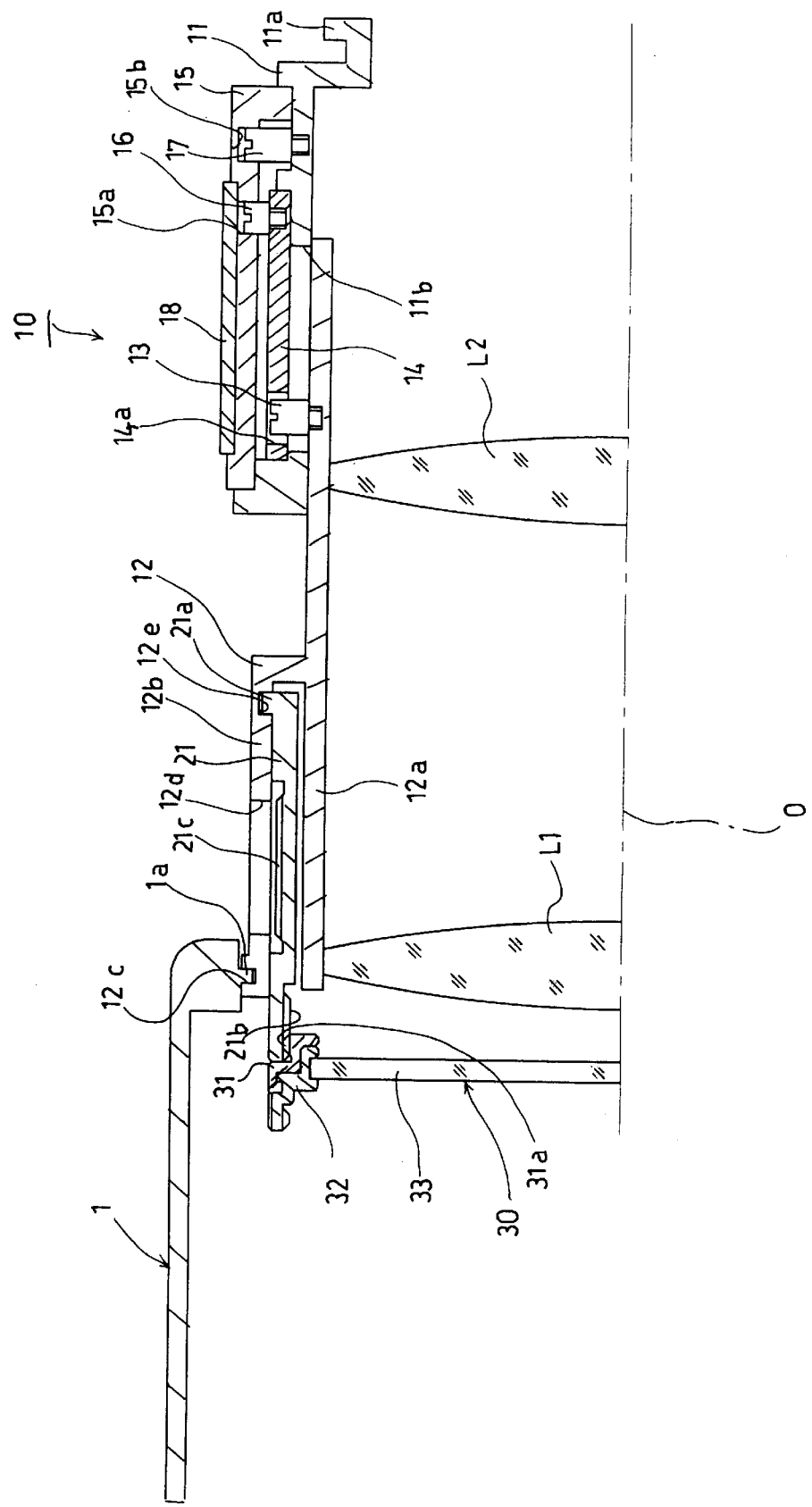
FIG. 2 is a cross-sectional view of the first embodiment of the lens barrel shown in FIG. 1 in a state where the focal point is set at the minimum distance, showing an upper half of the lens barrel from the optical axis thereof.

FIGS. 1 and 2 show the first embodiment of a lens barrel to which the present invention is applied. In each of FIGS.

1 and 2, a lens hood 1 and a screw-setting circular polarizing filter 30 have been attached to the front end of the lens barrel. FIG. 1 shows the lens barrel in a state where the focal point is set at infinity (∞), while FIG. 2 shows the lens barrel in a state where the focal point is set at a minimum distance.

The lens barrel 10 is an interchangeable lens barrel which can be detachably attached to the body of a camera (body of an optical instrument), e.g., an SLR camera. The lens barrel 10 is provided therein with a photographic optical system including a first lens group L1 and a second lens group L2.

The lens barrel 10 is provided with a stationary barrel 11 having a mount ring 11a at the rear end thereof. The mount ring 11a is connected to the corresponding mount ring of a camera body (not shown) to fix the lens barrel 10 to the camera body. The lens barrel 10 is further provided with a movable barrel 12. Rear portion of the movable barrel 12 is fitted in the stationary barrel 11 so that the movable barrel 12 is movable along an optical axis O relative to the stationary barrel 11. The first and second lens groups L1 and L2 are fixed to the movable barrel 12 to be positioned therein.

The movable barrel 12 is provided on the outer peripheral surface thereof with a plurality of follower pins 13 (only one of them is shown in each of FIGS. 1 and 2) each projecting outwardly in a radial direction. The plurality of follower pins 13 are slidably fitted into a corresponding plurality of linear guide slots 11b (only one of them is shown in each of FIGS. 1 and 2) formed on the stationary barrel 11, respectively. Each guide slot 11b extends in the direction of the optical axis O. Accordingly, the movable barrel 12 is guided in the direction of the optical axis O to be movable relative to the stationary barrel 11 by a linear guide mechanism including the follower pins 13 and the linear guide slots 11b.

A cam ring 14 is fitted on the outer peripheral surface of the stationary barrel 11 to be immovable in the direction of the optical axis O but rotatable about the optical axis O relative to the stationary barrel 11. The cam ring 14 is provided with a plurality of cam slots 14a (only one of them is shown in each of FIGS. 1 and 2) in which the tips of the follower pins 13 are fitted, respectively. The shapes of the plurality of cam slots 14a are the same, and each cam slot 14a extends to be inclined with respect to both the direction of the optical axis O and with respect to the circumference of the cam ring 14. Accordingly, rotating the cam ring 14 relative to the stationary barrel 11 causes the movable barrel 12 to move in the direction of the optical axis O via the plurality of follower pins 13, each of which is engaged with the corresponding linear guide slot 11b and the corresponding cam slot 14a at the same time.

The lens barrel 10 is further provided with a focusing ring 15 fitted on the stationary barrel 11 with the cam ring 14 being positioned between the stationary barrel 11 and the focusing ring 15. The focusing ring 15 is provided on the inner peripheral surface thereof with a hole 15a in which a pin 16 fixed on the outer peripheral surface of the cam ring 14 is fitted. The focusing ring 15 is further provided, on the inner peripheral surface thereof behind the hole 15a, with a circumferential groove 15b which extends circumferentially over a predetermined angular range. A plurality of pins 17 (only one of them is shown in each of FIGS. 1 and 2) which are fixed on the outer peripheral surface of the stationary barrel 11 are fitted in the circumferential groove 15b.

Accordingly, the focusing ring 15 is rotatable about the optical axis O relative to the stationary barrel 11 within a predetermined rotational range corresponding to the circumferential length of the circumferential groove 15b. Rotating the focusing ring 15 causes the cam ring 14 to rotate together with the focusing ring 15 since the pin 16 is fitted in the hole 15a. A rubber ring 18 is fixedly fitted on the outer peripheral surface of the focusing ring 15. When operating the focusing ring 15, the user holds the rubber ring 18 to rotate the focusing ring 15.

The movable barrel 12 is provided at the front thereof with an inner cylindrical portion 12a and an outer cylindrical portion (outer barrel) 12b whose inner diameter is greater than the outer diameter of the inner cylindrical portion 12a. The inner and outer cylindrical portions 12a and 12b are formed integral with the movable barrel 12. The outer cylindrical portion 12b is provided, on the outer peripheral surface at the front end thereof, with a circumferential groove (lens-hood mount portion) 12c which is engaged with a plurality of engaging projections 1a (only one of them is shown in each of FIGS. 1 and 2) formed at the rear end of the lens hood 1. The outer cylindrical portion 12b is provided behind the circumferential groove 12c with a rectangular operational opening 12d (see FIG. 20).

The lens barrel 10 is provided between the inner cylindrical portion 12a and the outer cylindrical portion 12b with a rotatable operational ring (inner barrel) 21. The rotatable operational ring 21 is fitted inside the outer cylindrical portion 12b to be rotatable about the optical axis O relative to the outer cylindrical portion 12b. The rotatable operational ring 21 is provided at the rear end thereof with an outer flange 21a which extends outwardly and radially. The outer flange 21a is fitted in a circumferential groove 12e formed on a corresponding portion of the inner peripheral surface of the outer cylindrical portion 12b. Accordingly, the rotatable operational ring 21 is rotatable about the optical axis O relative to the movable barrel 12 and is immovable in the direction of the optical axis O relative to the movable barrel 12.

The rotatable operational ring 21 is provided, on the inner peripheral surface at the front end thereof, with a female threaded portion (filter mount portion) 21b. A conventional screw-setting circular polarizing filter 30 is screwed on-the female threaded portion 21b.

The screw-setting circular polarizing filter 30 is provided with a mount ring 31 having a male thread portion 31a which is screw-engaged with the female thread portion 21b, a rotatable filter ring 32 which is rotatably fitted in and supported by the mount ring 31, and a circular polarizing filter 33 which is fixed to and supported by the rotatable filter ring 32.

Figure 20:
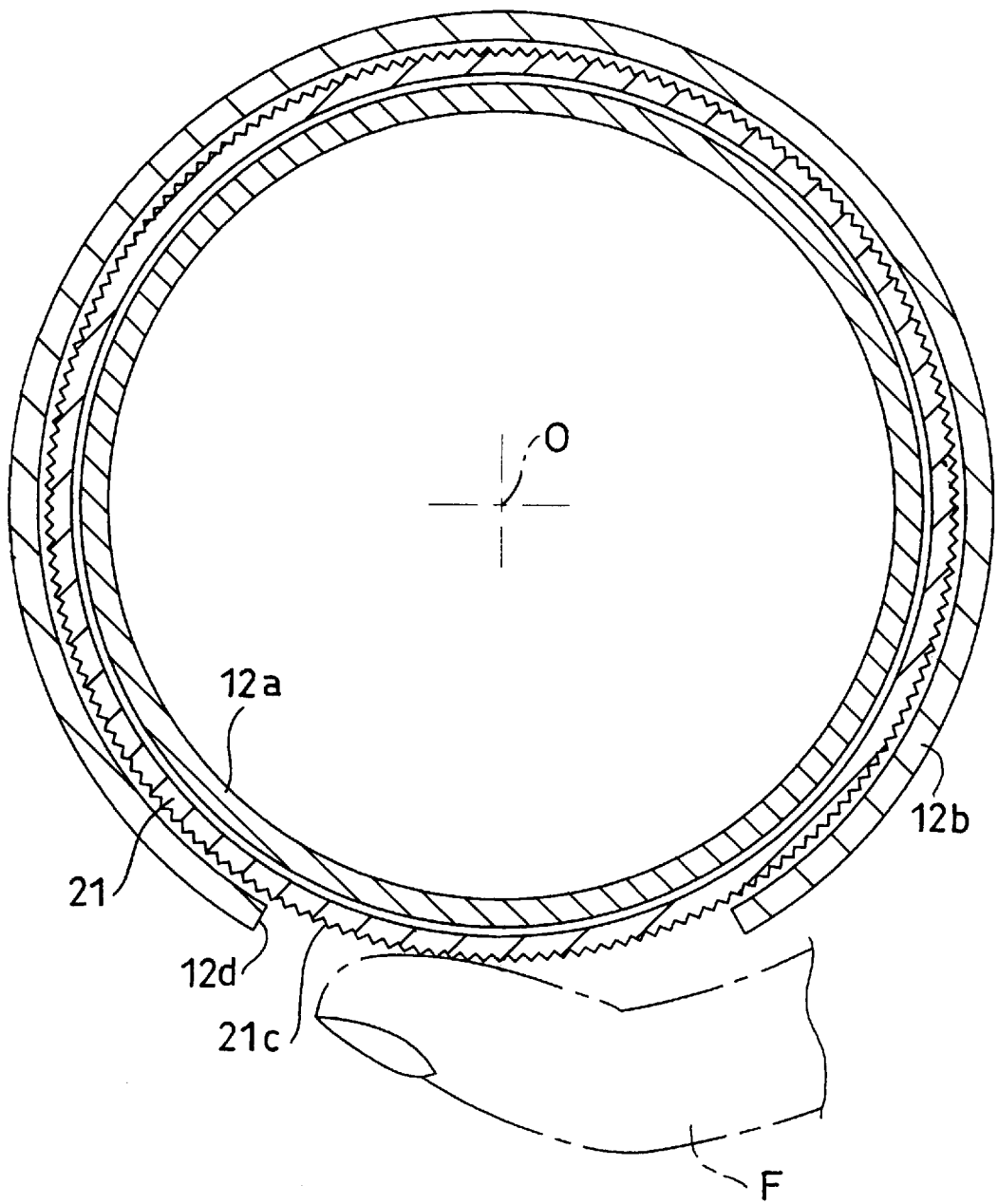
FIG. 20 is a cross-sectional view of the first embodiment of the lens barrel shown in FIG. 1, taken along A—A line in FIG. 1, looking in the direction of the appended arrows.

The circumferential part of the outer peripheral surface of the rotational operational ring 21, which is exposed through the operational opening 12d when the rotational operational ring 21 rotates, is knurled on the entire circumferential surface thereof to form a knurled operational surface portion 21c (see FIG. 20). The rotational operational ring 21, the knurled operational surface portion 21c, and the operational opening 12d constitute a filter adjustment mechanism (manual rotation structure). When operating the rotational operational ring 21, the user puts his or her finger F on the knurled operational surface portion 21c through the operational opening 12d and rotates the rotational operational ling 21 with finger F, as shown in FIG. 20.

Rotating the rotational operational ring 21 causes the circular polarizing filter 33 to rotate together with the rotational operational ring 21 since the circular polarizing filter 33 is attached to the front of the rotational operational ring 21. Therefore, the circular polarizing filter 33 can be manually rotated even with the lens hood 1 attached to the lens barrel 10.

The operation of the lens barrel 10 will be hereinafter discussed. Rotating the focusing ring 15 when the lens barrel 10 is in the state shown in FIG. 1 (i.e., in a state, wherein the focal point of the lens barrel 10 is set at infinity) in a predetermined forward rotational direction by manually rotating the rubber ring 18, causes the cam ring 14 to rotate together with the focusing ring 15 in the same rotational direction via the pin 16 and the hole 15a.

Subsequently, rotation of the cam ring 14 causes the follower pins 13, which are respectively fitted in the cam slots 14a, to advance in the direction of the optical axis O along the contours of the cam slots 14a. At the same time, the movable barrel 12 advances in the direction of the optical axis O since the follower pins 13 are guided linearly in the direction of the optical axis O by the linear guide slots 11b, respectively.

Accordingly, rotating the focusing ring 15 in the forward rotational direction thereof causes the movable barrel 12 to advance in the direction of the optical axis O, which moves the focal point of the photographic optical system (including the first and second lens groups L1 and L2) towards the minimum distance side. Further rotating the focusing ring 15 in the forward rotational direction thereof results in the lens barrel 10 attaining the state shown in FIG. 2, i.e., the focal point is set at the minimum distance.

Rotating the focusing ring 15, when the lens barrel 10 is in the state shown in FIG. 2, in the reverse rotational direction by manually rotating the focusing ring 15 causes the movable barrel 12 to retreat in the direction of the optical axis O, which moves the focal point of the photographic optical system towards the infinity side. Further rotating the focusing ring 15 in the reverse rotational direction thereof causes the lens barrel 10 to return to the state shown in FIG. 1, i.e., the focal point is set at infinity.

When desiring to adjust the angle of rotation of the circular polarizing filter 33, the user only has to operate the knurled operational surface portion 21c, which is exposed through the operational opening 12d, by rotating the focusing ring 15 with his or her finger F.

As can be understood from the foregoing, according to the first embodiment of the lens barrel 10 to which the present invention is applied, the circular polarizing filter 33 can be easily rotated even with the lens hood 1 attached to the lens barrel 10.

Figure 3:
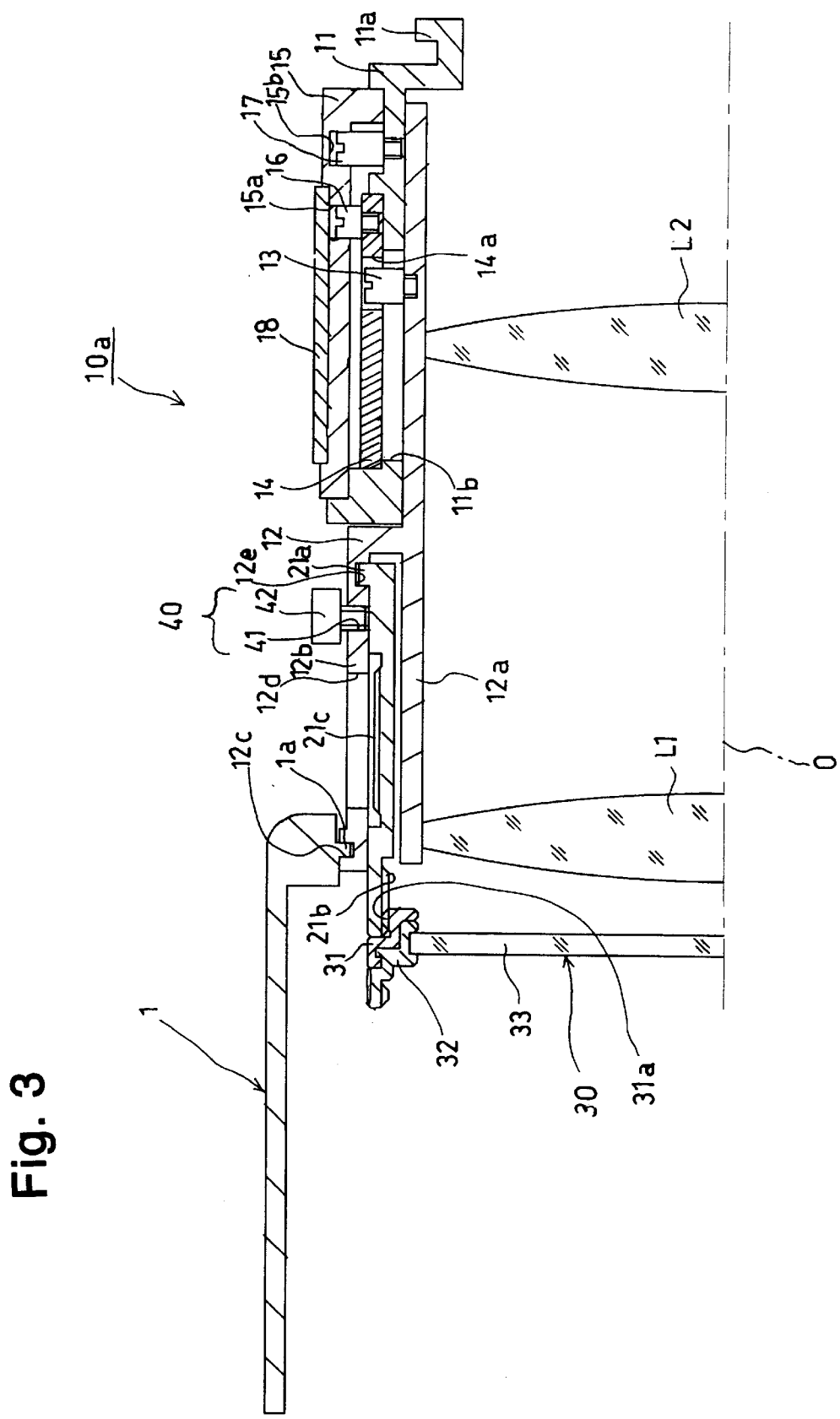
FIG. 3 is a cross-sectional view of the second embodiment of a lens barrel to which the present invention is applied, in a state where the focal point is set at infinity, showing an upper half of the lens barrel from the optical axis thereof.
Figure 4:
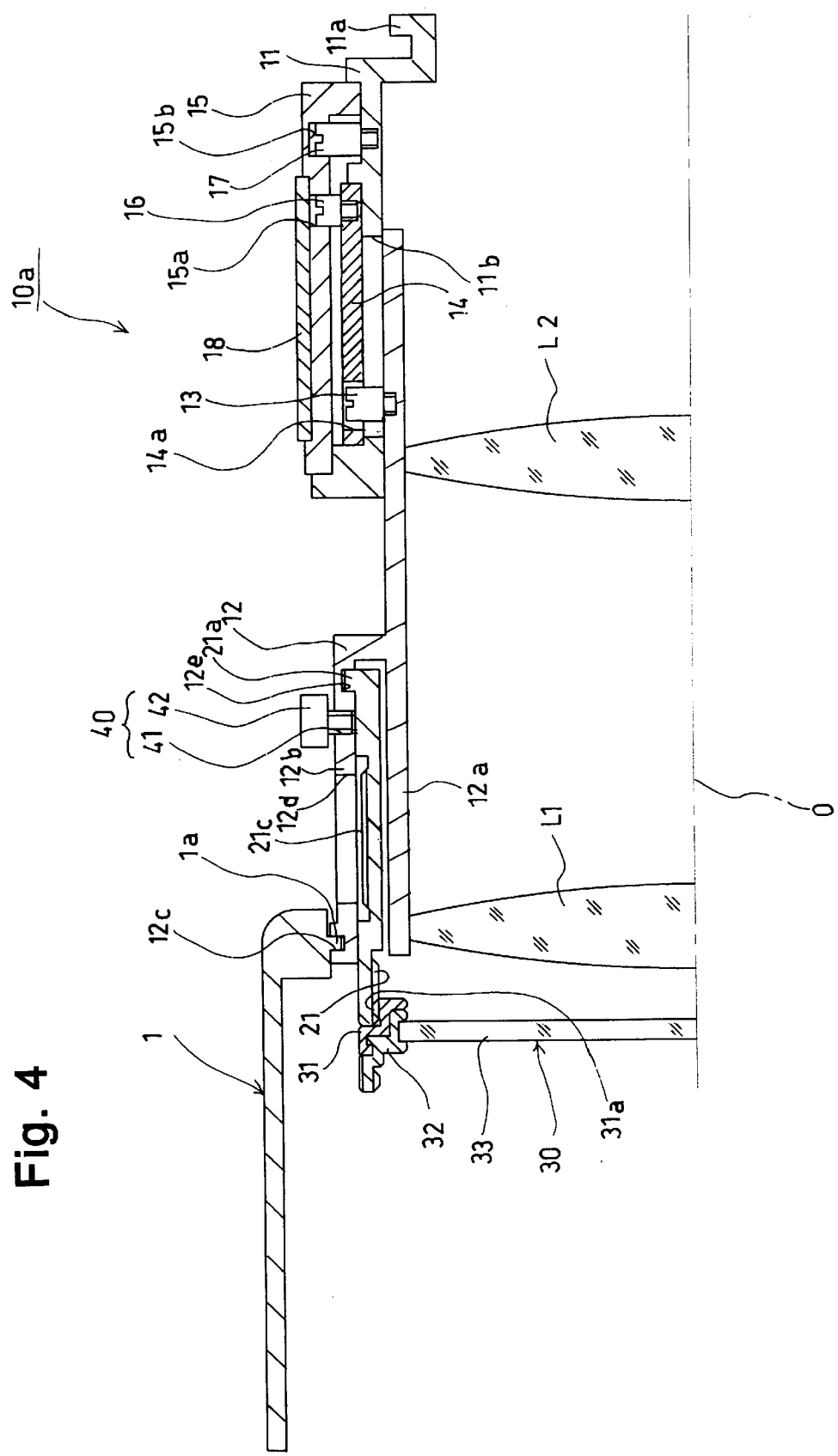
FIG. 4 is a cross-sectional view of the second embodiment of the lens barrel shown in FIG. 3 in a state where the focal point is set at the minimum distance, showing an upper half of the lens barrel from the optical axis thereof.

FIGS. 3 and 4 show the second embodiment of a lens barrel to which the present invention is applied. FIG. 3 shows the lens barrel in a state where the focal point is set at infinity (∞), while FIG. 4 shows the lens barrel in a state where the focal point is set at a minimum distance. The second embodiment of the lens barrel 10a is the same as the first embodiment of the lens barrel 10 except that the lens barrel 10a is further provided with a rotatable operational ring lock mechanism 40 which includes a female screw hole 41 and a lock screw nut 42. The female screw hole 41 is formed on the outer cylindrical portion 12b of the movable barrel 12 to extend in a radial direction, while the lock screw nut 42 is screwed in the female screw hole 41.

If the lock screw nut 42 is fastened by rotating the lock screw nut 42 in a predetermined rotational direction, the tip of the male screw shaft of the lock screw nut 42 is pressed against the outer peripheral surface of the rotatable operational ring 21, which locks the rotatable operational ring 21, i.e., the rotatable operational ring 21 is prevented from being rotated relative to the outer cylindrical portion 12b. If the lock screw nut 42 is loosened by rotating the lock screw nut 42 in the reverse rotational direction, the tip of the male screw shaft of the lock screw nut 42 is released from the outer peripheral surface of the rotatable operational ring 21, which unlocks the rotatable operational ring 21, i.e., the rotatable operational ring 21 is allowed to rotate relative to the outer cylindrical portion 12b.

According to the second embodiment of the lens barrel 10a having the rotatable operational ring lock mechanism 40, since the rotatable operational ring 21 can be locked so as not to rotate relative to the outer cylindrical portion 12b, the rotatable operational ring 21 is prevented from rotating unexpectedly when the user desires to hold the angle of rotation of the circular polarizing filter 33.

Furthermore, when the user attaches the screw-setting circular polarizing filter 30 to the female threaded portion 21b of the rotatable operational ring 21, he or she does not have to hold the rotatable operational ring 21 by his or her hand in order to prevent the rotatable operational ring 21 from rotating while screwing the male thread portion 31a of the circular polarizing filter 30 on the female threaded portion 21b, as long as the rotatable operational ring 21 is locked using the rotatable operational ring lock mechanism 40. This makes it easy for the user to attach the screw-setting circular polarizing filter 30 to the lens barrel 10a.

Figure 5:
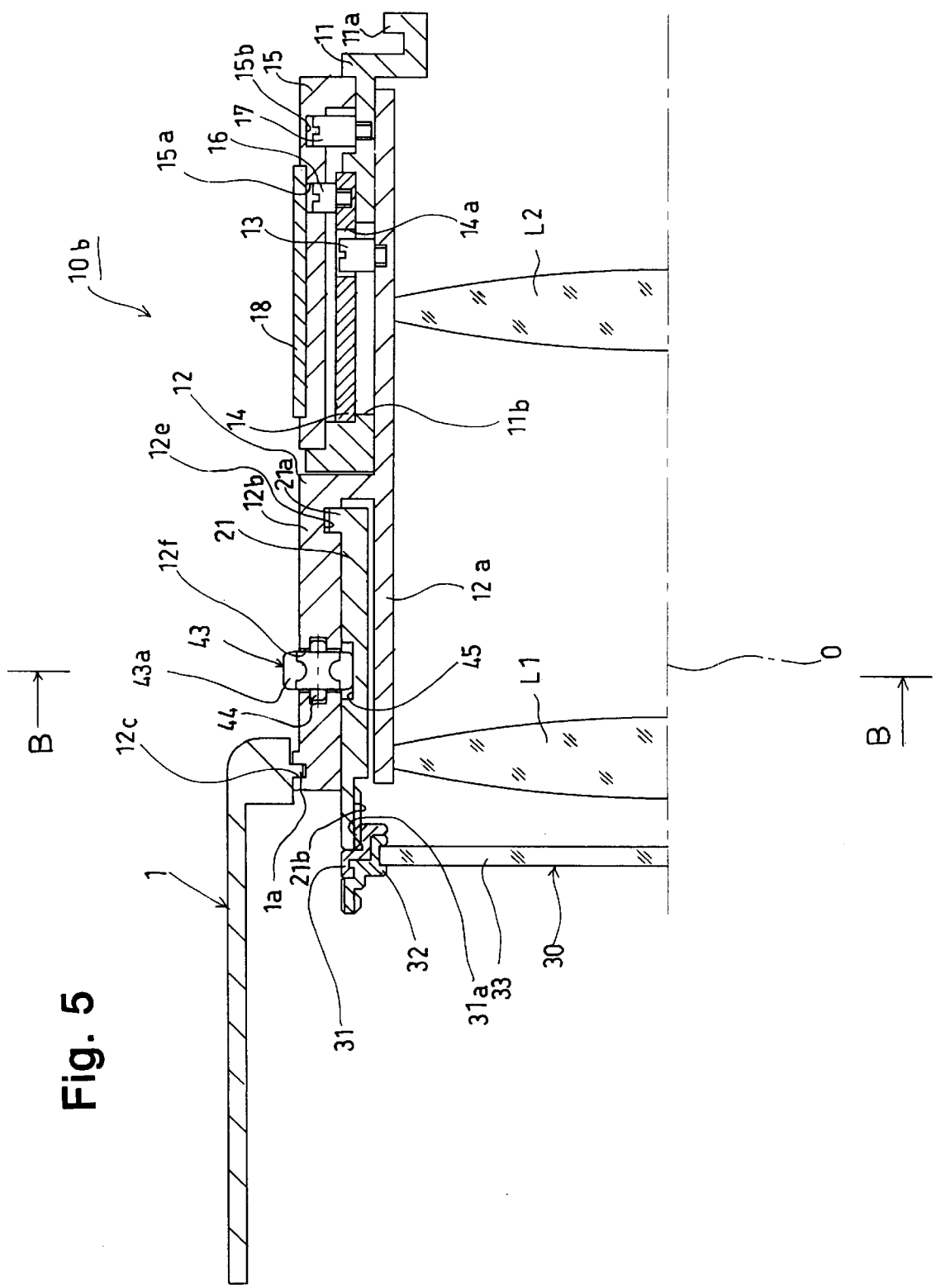
FIG. 5 is a cross-sectional view of the third embodiment of a lens barrel to which the present invention is applied, in a state where the focal point is set at infinity, showing an upper half of the lens barrel from the optical axis thereof.
Figure 6:
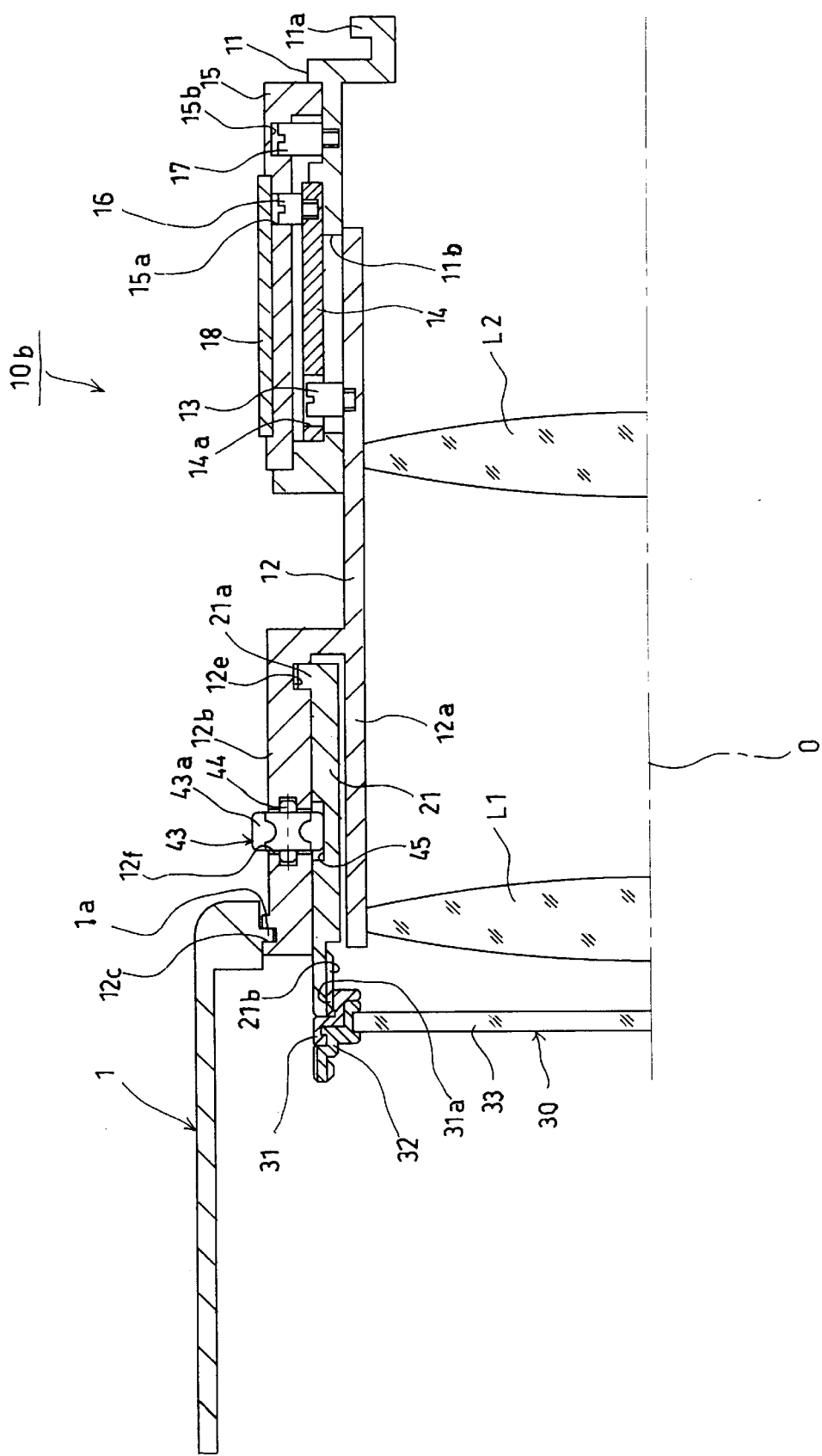
FIG. 6 is a cross-sectional view of the third embodiment of the lens barrel shown in FIG. 5 in a state where the focal point is set at the minimum distance, showing an upper half of the lens barrel from the optical axis thereof.

FIGS. 5 and 6 show the third embodiment of a lens barrel to which, the present invention is applied. FIG. 5 shows the lens barrel in a state where the focal point is set at infinity (∞), while FIG. 6 shows the lens barrel in a state where the focal point is set at a minimum distance. In the third embodiment of the lens barrel 10b, the user can rotate the circular polarizing filter 33 by rotating an operational roller 43 by his or her finger F (see FIG. 21). The operational roller 43 is rotatably supported by the movable barrel 12.

Figure 21:
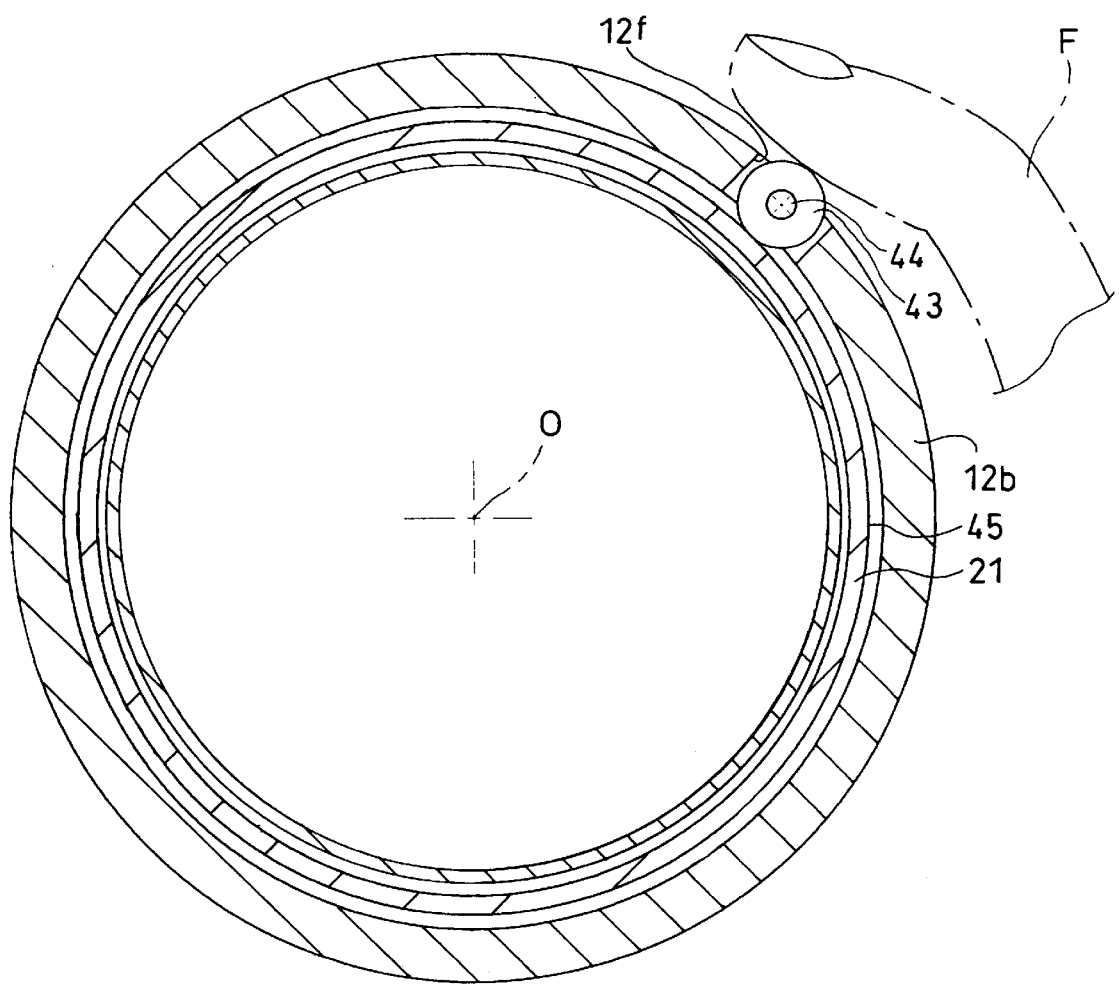
FIG. 21 is a cross-sectional view of the third embodiment of the lens barrel shown in FIG. 5, taken along B—B line in FIG. 5, looking in the direction of the appended arrows.

The lens barrel 10b is provided, on the outer cylindrical portion 12b behind the circumferential groove (lens-hood mount portion) 12c, with an operational roller opening 12f in which the operational roller 43 is rotatably positioned (see FIG. 21). The operational roller 43 is fitted on an axial shaft 44 which extends in the direction of the optical axis O. The respective ends of the axial shaft 44 are supported in the operational roller opening 12f by corresponding portions of the outer cylindrical portion 12b. Outer peripheral part of the operational roller 43 is formed as a rubber ring portion 43a which projects radially out of the inner and outer peripheral surfaces of the outer cylindrical portion 12b.

The rotatable operational ring 21 of the third embodiment of the lens barrel 10b is provided on the outer peripheral surface thereof with a circumferential annular groove 45 in place of the knurled operational surface portion 21c of the first embodiment of the lens barrel 10. The outer peripheral surface of the rubber ring portion 43a of the operational roller 43 stays in contact with the bottom surface of the circumferential annular groove 45. In other words, the rotational operational ring 21, the circumferential annular groove 45, the operational roller 43, the axial shaft 44, and the operational roller opening 12f constitute a filter adjustment mechanism (manual rotation structure).

Accordingly, if the user rotates the operational roller 43, part of which projects out of the operational roller opening 12f, by his or her finger F, the rotational operational ring 21 rotates since the outer peripheral surface of the rubber ring portion 43a of the operational roller 43 is in contact with the bottom surface of the circumferential annular groove 45, so that the circular polarizing filter 33 rotates. The structure of the remaining components of the third embodiment of the lens barrel 10b are the same as those of the first embodiment of the lens barrel 10.

Figure 7:
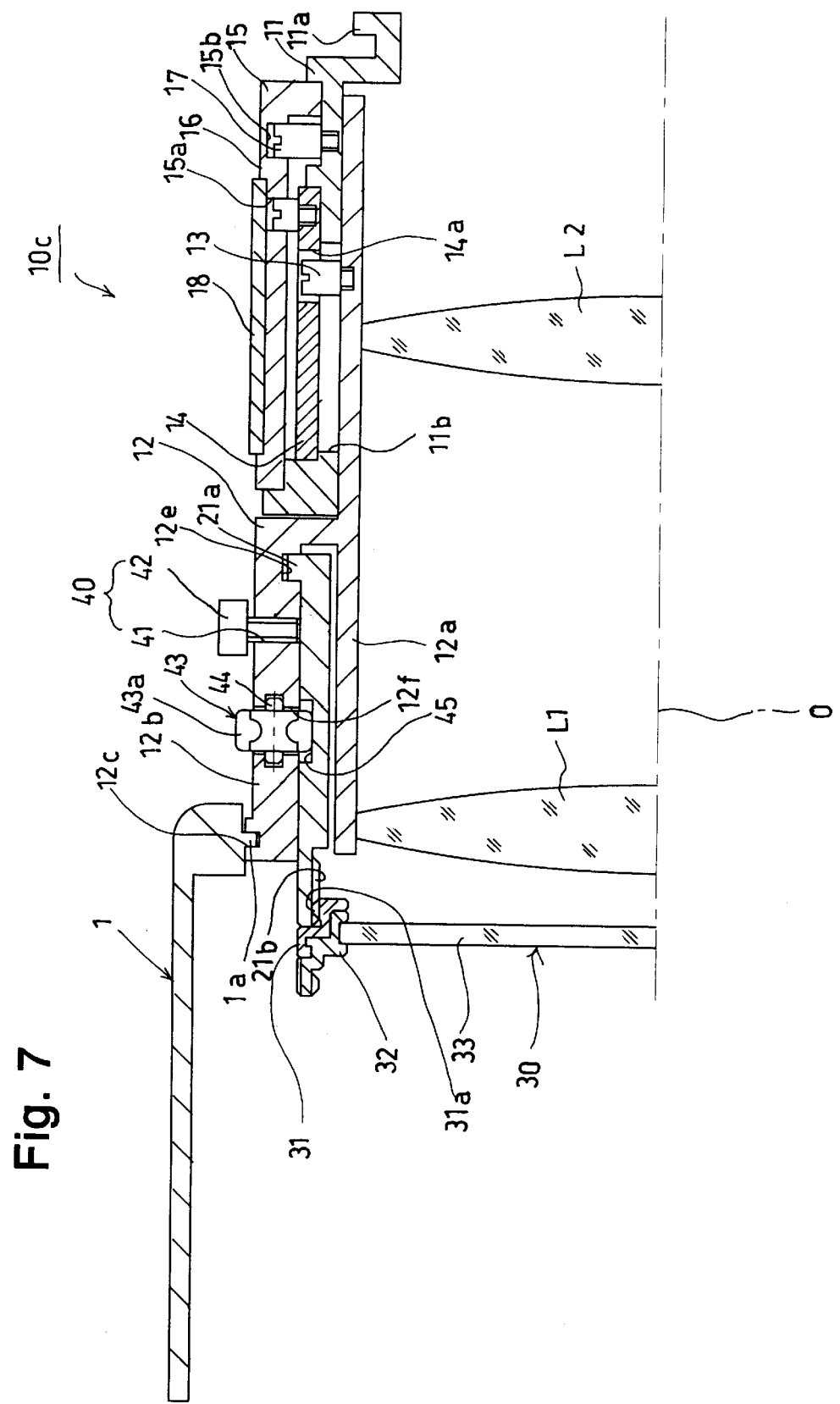
FIG. 7 is a cross-sectional view of the fourth embodiment of a lens barrel to which the present invention is applied, in a state where the focal point is set at infinity, showing an upper half of the lens barrel from the optical axis thereof.
Figure 8:
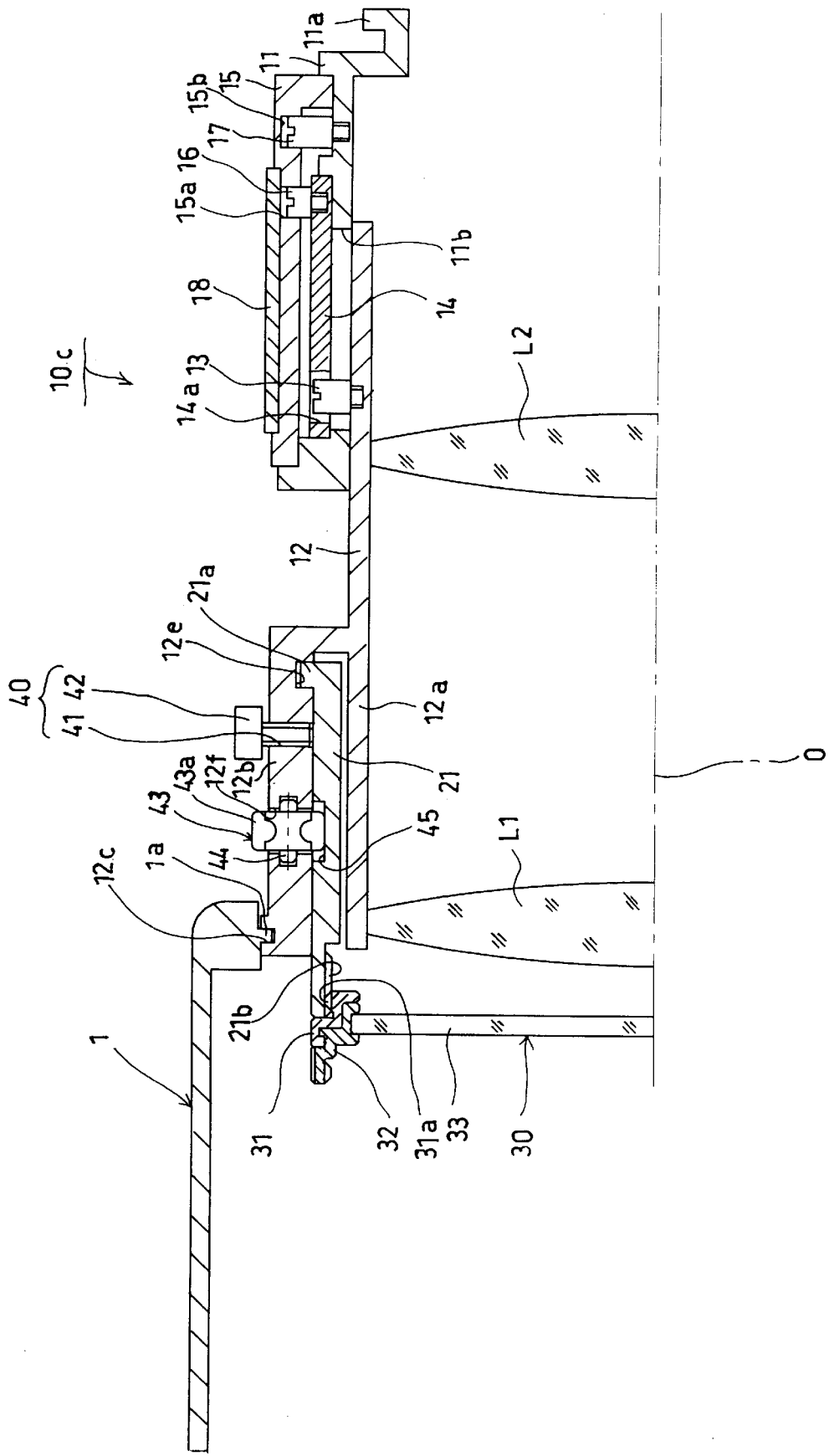
FIG. 8 is a cross-sectional view of the fourth embodiment of the lens barrel shown in FIG. 7 in a state where the focal point is set at the minimum distance, showing an upper half of the lens barrel from the optical axis thereof.

FIGS. 7 and 8 show the fourth embodiment of a lens barrel to which the present invention is applied. FIG. 7 shows the lens barrel in a state where the focal point is set at infinity (∞), while FIG. 8 shows the lens barrel in a state where the focal point is set at a minimum distance. The fourth embodiment of the lens barrel 10c is the same as the third embodiment of the lens barrel 10b except that the lens barrel 10c is further provided with a rotatable operational ring lock mechanism (lock mechanism) 40 (which is identical to the rotatable operational ring lock mechanism 40 of the second embodiment of the lens barrel 10a) which includes a female screw hole 41 and a lock screw nut 42. The female screw hole 41 is formed on the outer cylindrical portion 12b of the movable barrel 12 to extend in a radial direction, while the lock screw nut 42 is screwed in the female screw hole 41.

According to the fourth embodiment of the lens barrel 10c, similar to the second embodiment of the lens barrel 10a, the rotatable operational ring 21 can be locked so as not to rotate relative to the outer cylindrical portion 12b, so that the rotatable operational ring 21 is prevented from rotating unexpectedly when the user desires to hold the angle of rotation of the circular polarizing filter 33.

Furthermore, when the user attaches the screw-setting circular polarizing filter 30 to the female threaded portion 21b of the rotatable operational ring 21, he or she does not have to hold the rotatable operational ring 21 by his or her hand so as not to rotate the rotatable operational ring 21 while screwing the male thread portion 31a of the circular polarizing filter 30 on the female threaded portion 21b, so long as the rotatable operational ring 21 is locked using the rotatable operational ring lock mechanism 40. This makes it easy for the user to attach the screw-setting circular polarizing filter 30 to the lens barrel 10c.

Figure 9:
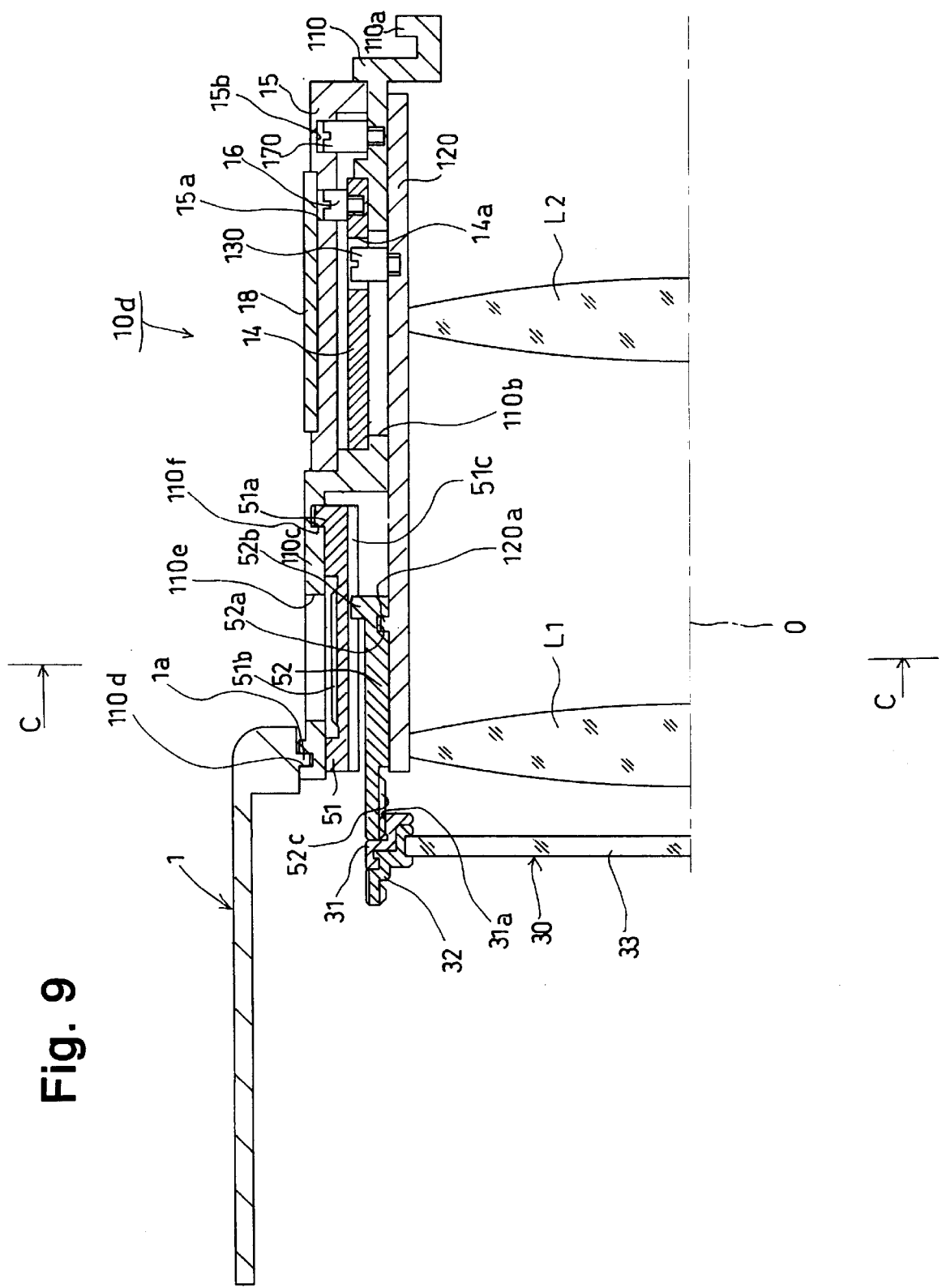
FIG. 9 is a cross-sectional view of the fifth embodiment of a lens barrel to which the present invention is applied, in a state where the focal point is set at infinity, showing an upper half of the lens barrel from the optical axis thereof.
Figure 10:
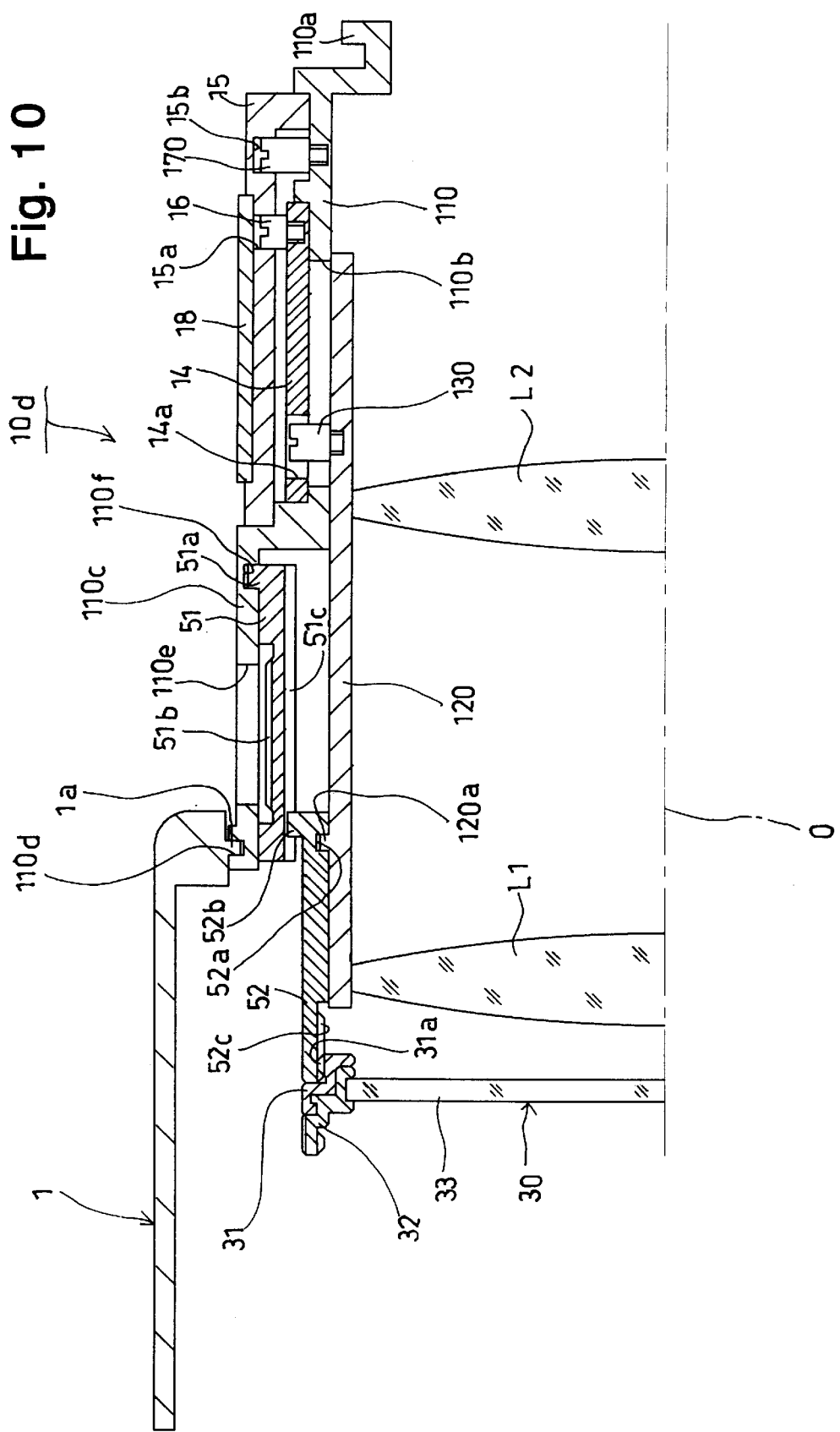
FIG. 10 is a cross-sectional view of the fifth embodiment of the lens barrel shown in FIG. 9 in a state where the focal point is set at the minimum distance, showing an upper half of the lens barrel from the optical axis thereof.

FIGS. 9 and 10 show the fifth embodiment of a lens barrel to which the present invention is applied. FIG. 9 shows the lens barrel in a state where the focal point is set at infinity (∞), while FIG. 10 shows the lens barrel in a state where the focal point is set at a minimum distance.

The lens barrel 10d is provided with a stationary barrel 110 having a mount ring 110a at the rear end thereof. The mount ring 110a is connected to a corresponding mount ring of a camera body (not shown) to fix the lens barrel 10d to the camera body. The lens barrel 10d is further provided with a movable barrel 120. Rear portion of the movable barrel 120 is fitted inside the stationary barrel 110 so that the movable barrel 120 is movable along an optical axis O relative to the stationary barrel 110. The first and second lens groups L1 and L2 are fixed to the movable barrel 120 to be positioned therein.

The movable barrel 120 is provided on the outer peripheral surface thereof with a plurality of follower pins 130 (only one of them is shown in each of FIGS. 9 and 10) each projecting outwardly in a radial direction. The plurality of follower pins 130 are slidably fitted in a corresponding plurality of linear guide slots 110b (only one of them is shown in each of FIGS. 9 and 10) formed on the stationary barrel 110, respectively. Each guide slot 110b extends in the direction of the optical axis O. Accordingly, the movable barrel 120 is guided in the direction of the optical axis O to be movable relative to the stationary barrel 110 by a linear guide mechanism which includes the follower pins 130 and the linear guide slots 110b.

A cam ring 14 is fitted on the outer peripheral surface of the stationary barrel 110 to be immovable in the direction of the optical axis O and rotatable about the optical axis O relative to the stationary barrel 110. The cam ring 14 is provided with a plurality of cam slots 14a (only one of them is shown in each of FIGS. 9 and 10) in which the tips of the follower pins 130 are fitted, respectively. Accordingly, rotating the cam ring 14 relative to the stationary barrel 110 causes the movable barrel 120 to move in the direction of the optical axis O via the plurality of follower pins 130, each of which is engaged with the corresponding linear guide slot 110b and the corresponding cam slot 14a at the same time.

The lens barrel 10d is further provided with a focusing ring 15 fitted on the stationary barrel 110 with the cam ring 14 being positioned between the stationary barrel 110 and the focusing ring 15. The focusing ring 15 is provided on the inner peripheral surface thereof with a hole 15a in which a pin 16 fixed on the outer peripheral surface of the cam ring 14 is fitted. The focusing ring 15 is further provided, on the inner peripheral surface thereof behind the hole 15a, with a circumferential groove 15b which extends circumferentially over a predetermined angular range. A plurality of pins 170 (only one of them is shown in each of FIGS. 9 and 10) which are fixed on the outer peripheral surface of the stationary barrel 110 are fitted in the circumferential groove 15b.

Accordingly, the focusing ring 15 is rotatable about the optical axis O relative to the stationary barrel 110 within a predetermined rotational range corresponding to the circumferential length of the circumferential groove 15b. Rotating the focusing ring 15 causes the cam ring 14 to rotate together with the focusing ring 15 since the pin 16 is fitted in the hole 15a. A rubber ring 18 is fixed onto the outer peripheral surface of the focusing ring 15.

The stationary barrel 110 is provided at the front thereof with an expanded cylindrical portion (outer barrel) 110c whose inner diameter is greater than the outer diameter of the middle portion of the stationary barrel 110 on which the linear guide slots 110b is formed. The expanded cylindrical portion 110c is provided, on the outer peripheral surface at the front end thereof, with a circumferential groove (lenshood mount portion) 110d which is engaged with the plurality of engaging projections 1a (only one of them is shown in each of FIGS. 9 and 10) of the lens hood 1. The expanded cylindrical portion 110c is provided behind the circumferential groove 110d with a rectangular operational opening 110e (see FIG. 22).

The lens barrel 10d is provided between the expanded cylindrical portion 110c and the movable barrel 120 with a rotatable operational ring (middle barrel) 51 and a filter mount ring (inner barrel) 52. The rotatable operational ring 51 is fitted in the expanded cylindrical portion 110c to be rotatable about the optical axis O relative to the expanded cylindrical portion 110c. The rotatable operational ring 51 is provided at the rear end thereof with an outer flange 51a which extends outwardly and radially. The outer flange 51a is fitted in a circumferential groove 110f formed on a corresponding portion of the inner peripheral surface of the expanded cylindrical portion 110c. Accordingly, the rotatable operational ring 51 is rotatable about the optical axis O relative to the stationary barrel 110 and is immovable in the direction of the optical axis O relative to the stationary barrel 110.

Figure 22:
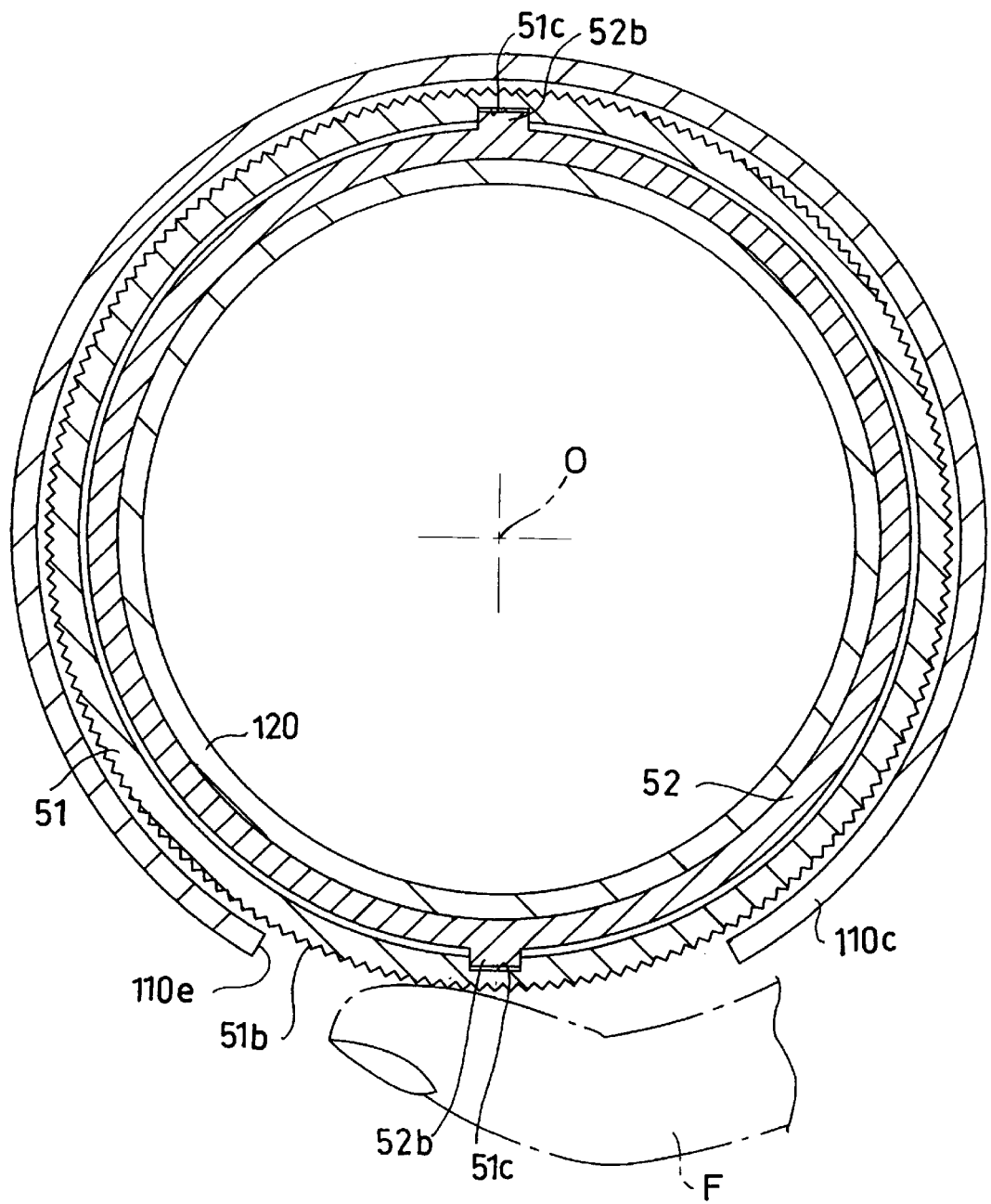
FIG. 22 is a cross-sectional view of the fifth embodiment of the lens barrel shown in FIG. 9, taken along C—C line in FIG. 9, looking in the direction of the appended arrows.

The circumferential part of the outer peripheral surface of the rotational operational ring 51 which is exposed through the operational opening 110e when the rotational operational ring 51 rotates, is knurled on the entire circumferential surface thereof to form a knurled operational surface portion 51b (see FIG. 22). The rotational operational ring 51, the knurled operational surface portion 51b, the operational opening 110e, and the filter mount ring 52 constitute a filter adjustment mechanism (manual rotation structure). When operating the rotational operational ring 51, the user puts his or her finger F on the knurled operational surface portion 51b through the operational opening 110e and moves the finger F to rotate the rotational operational ring 51 as shown in FIG. 22. The rotational operational ring 51 is provided on the inner peripheral surface thereof with a pair of linear guide grooves 51c (only one of them is shown in each of FIGS. 9 and 10) each extending in the direction of the optical axis O.

The filter mount ring 52 is fitted in the front of the movable barrel 120 to be rotatable about the optical axis O relative to the movable barrel 120. The filter mount ring 52 is provided, on the inner peripheral surface in the vicinity of the rear end thereof, with a circumferential groove 52a in which an outer flange 120a formed on the outer peripheral surface of the movable barrel 120 is fitted. Accordingly, the filter mount ring 52 is rotatable about the optical axis O relative to the movable barrel 120 and is immovable in the direction of the optical axis O relative to the movable barrel 120.

The filter mount ring 52 is provided at the rear end thereof with a pair of engaging projections 52b (only one of them is shown in each of FIGS. 9 and 10) each extending outwardly in a radial direction. Each engaging projection 52b is fitted in the corresponding linear guide groove 51c. The engaging projections 52b and the corresponding linear guide grooves 51c constitute a rotation transmitting device.

The filter mount ring 52 is provided, on the inner peripheral surface at the front end thereof, with a female threaded portion (filter mount portion) 52c. A conventional screw-setting circular polarizing filter 30 is screwed on the female threaded portion 52c.

The operation of the lens barrel 10d will be hereinafter discussed. Rotating the focusing ring 15 when the lens barrel 10d is in the state shown in FIG. 9 (i.e., in a state where the focal point of the lens barrel 10d is set at infinity) in a predetermined forward rotational direction by manually rotating the rubber ring 18 causes the cam ring 14 to rotate together with the focusing ring 15 in the same rotational direction via the pin 16 and the hole 15a.

Subsequently, rotation of the cam ring 14 causes the follower pins 130, which are respectively fitted in the cam slots 14a, to advance in the direction of the optical axis O along the contours of the cam slots 14a. At the same time, the movable barrel 120 advances in the direction of the optical axis O since the follower pins 130 are guided linearly in the direction of the optical axis O by the linear guide slots 110b, respectively.

Accordingly, rotating the focusing ring 15 in the forward rotational direction thereof causes the movable barrel 120 to advance in the direction of the optical axis O, which moves the focal point of the photographic optical system (including the first and second lens groups L1 and L2) towards the minimum distance side. Further rotating the focusing ring 15 in the forward rotational direction thereof results in the lens barrel 10d attaining the state shown in FIG. 10, i.e., the focal point is set at the minimum distance.

Rotating the focusing ring 15 when the lens barrel 10d is in the state shown in FIG. 10 in the reverse rotational direction by manually rotating the focusing ring 15 causes the movable barrel 120 to retreat in the direction of the optical axis O, which moves the focal point of the photographic optical system towards the side of infinity. Further rotating the focusing ring 15 in the reverse rotational direction thereof causes the lens barrel 10d to return to the state shown in FIG. 9, i.e., the focal point is set at infinity.

When the movable barrel 120 moves in the direction of the optical axis O, each engaging projection 52b moves along the corresponding linear guide groove 51c (i.e., the filter mount ring 52 moves in the direction of the optical axis O relative to the rotational operational ring 51), but neither the rotational operational ring 51 nor the filter mount ring 52 rotates relative to the movable barrel 120.

When desiring to adjust the angle of rotation of the circular polarizing filter 33, the user has only to operate the knurled operational surface portion 51b, which is exposed through the operational opening 110e, to rotate the rotational operational ring 51 with his or her finger F. Rotating the rotational operational ring 51 by operating the knurled operational surface portion 51b causes the filter mount ring 52 to rotate together with the rotational operational ring 51 in the same rotational direction due to the engagement of the engaging projections 52b with the linear guide grooves 51c, to thereby rotate the circular polarizing filter 33, which is attached to the front end of the filter mount ring 52. Hence, according to the fifth embodiment of the lens barrel 10d, the circular polarizing filter 33 can be easily rotated even with the lens hood 1 attached to the lens barrel 10.

In each of the first through fourth embodiments of the lens barrels 10, 10a, 10b and 10c, if the focal point is changed by rotating the focusing ring 15, the rotatable operational portion (the knurled operational surface portion 21c or the operational roller 43) for rotating the circular polarizing filter 33 moves in the direction of the optical axis O, so that the position of a holding part of the lens barrel (10, 10a, 10b or 10c), which is held by hand of the user when they operates the rotatable operational portion, is not constant.

However, according to the fifth embodiment of the lens barrel 10d, the position of the holding part of the lens barrel is constant since the rotatable operational portion (i.e., the knurled operational surface portion 51b) does not move in the direction of the optical axis O relative to the stationary barrel 110 even if the focal point is varied by operating the focusing ring 15. This facilitates the handling of the lens barrel.

Figure 11:
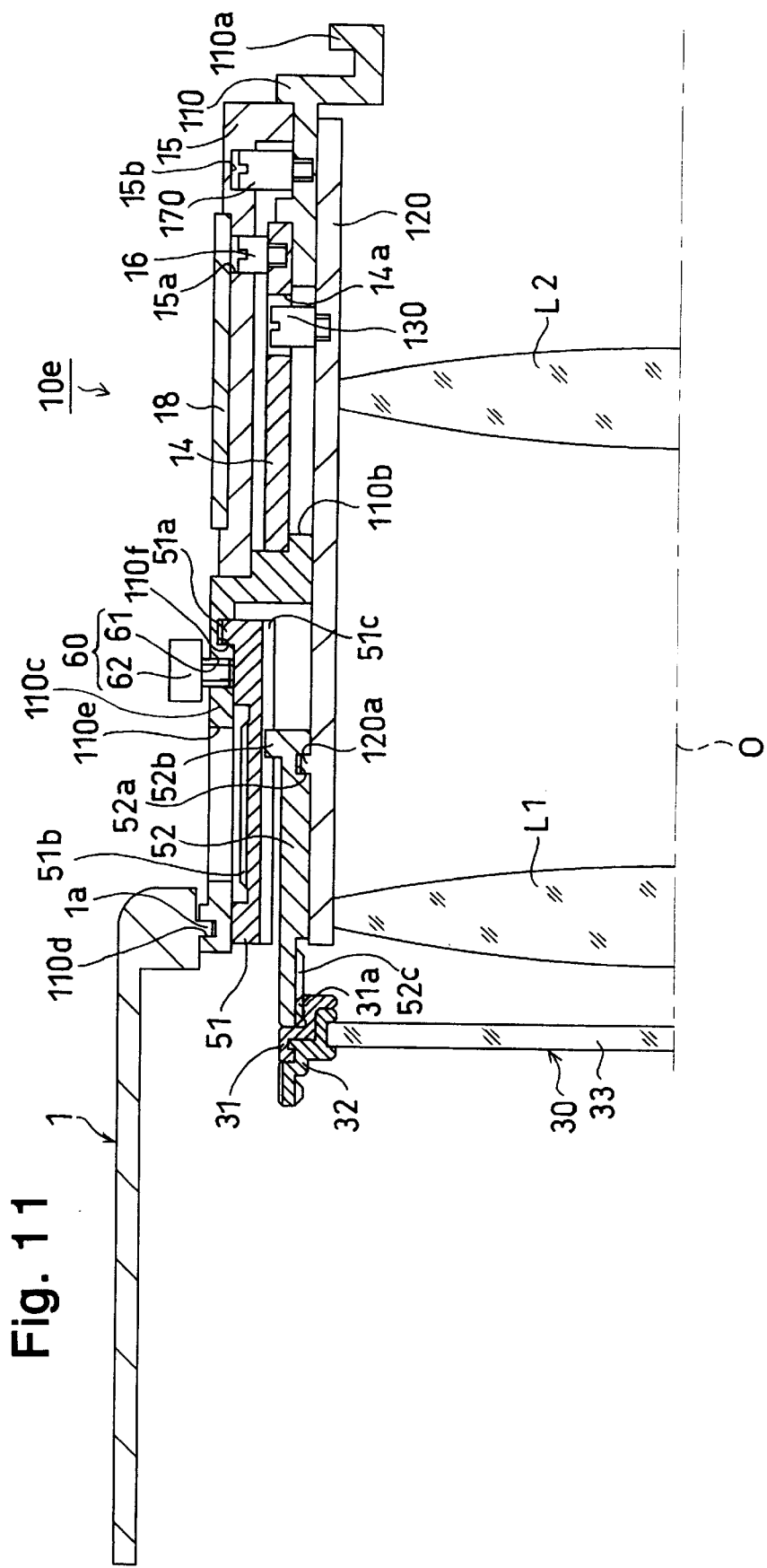
FIG. 11 is a cross-sectional view of the sixth embodiment of a lens barrel to which the present invention is applied, in a state where the focal point is set at infinity, showing an upper half of the lens barrel from the optical axis thereof.
Figure 12:
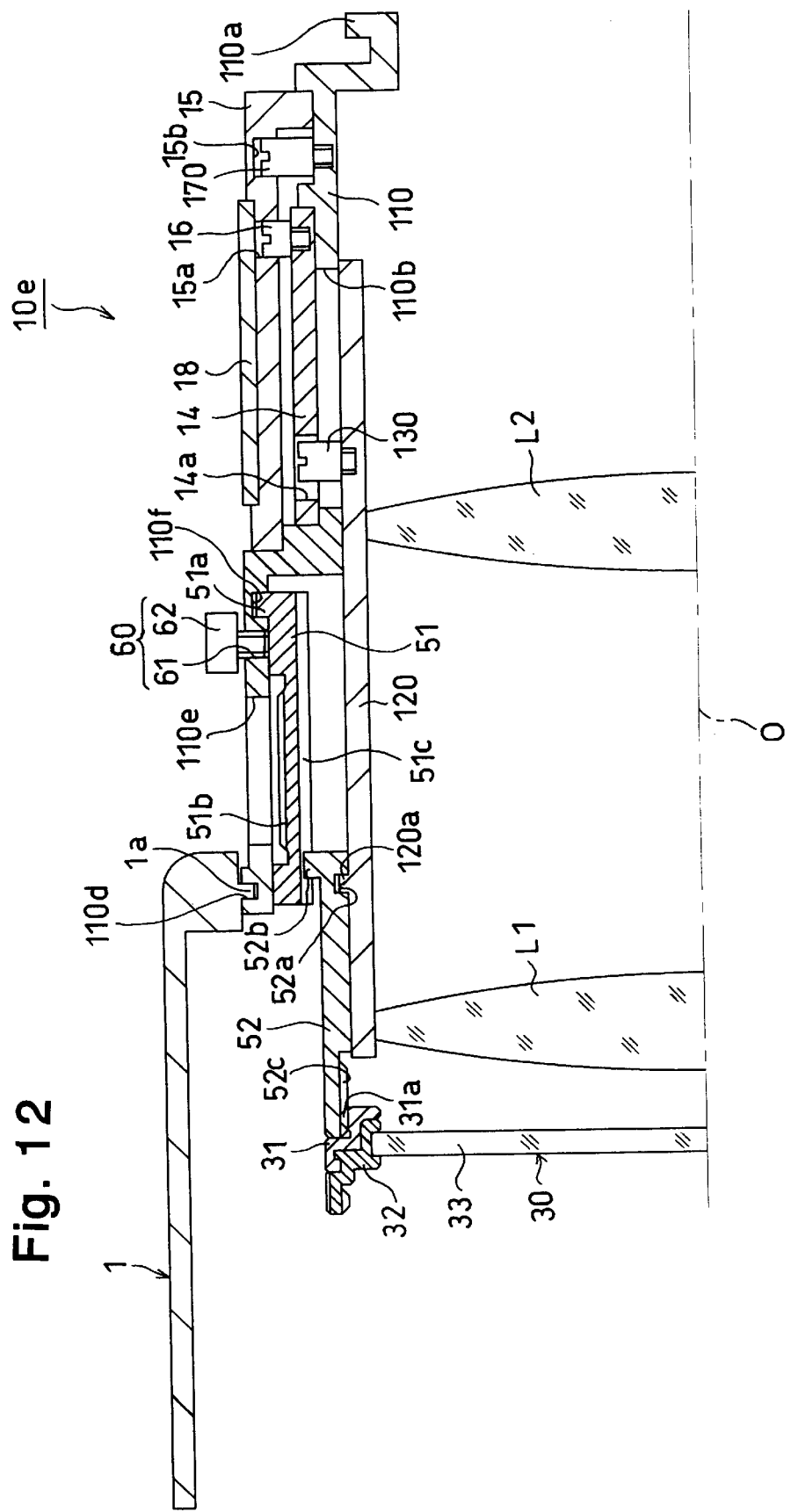
FIG. 12 is a cross-sectional view of the sixth embodiment of the lens barrel shown in FIG. 11 in a state where the focal point is set at the minimum distance, showing an upper half of the lens barrel from the optical axis thereof.

FIGS. 11 and 12 show the sixth embodiment of a lens barrel to which the present invention is applied. FIG. 11 shows the lens barrel in a state where the focal point is set at infinity (∞), while FIG. 12 shows the lens barrel in a state where the focal point is set at a minimum distance. A female screw hole 61 is formed on the expanded cylindrical portion 110c of the stationary barrel 110 to extend in a radial direction, while a lock screw nut 62 is screwed in the female screw hole 61.

If the lock screw nut 62 is fastened to lock the rotatable operational ring 51, the filter mount ring 52 is also locked via the linear guide grooves 51c and the engaging projections 52b. The sixth embodiment of the lens barrel 10e is the same as the fifth embodiment of the lens barrel 10d except that the lens barrel 10e is further provided with a rotatable operational ring lock mechanism (lock mechanism) 60 which includes the female screw hole 61 and the lock screw nut 62.

Figure 13:
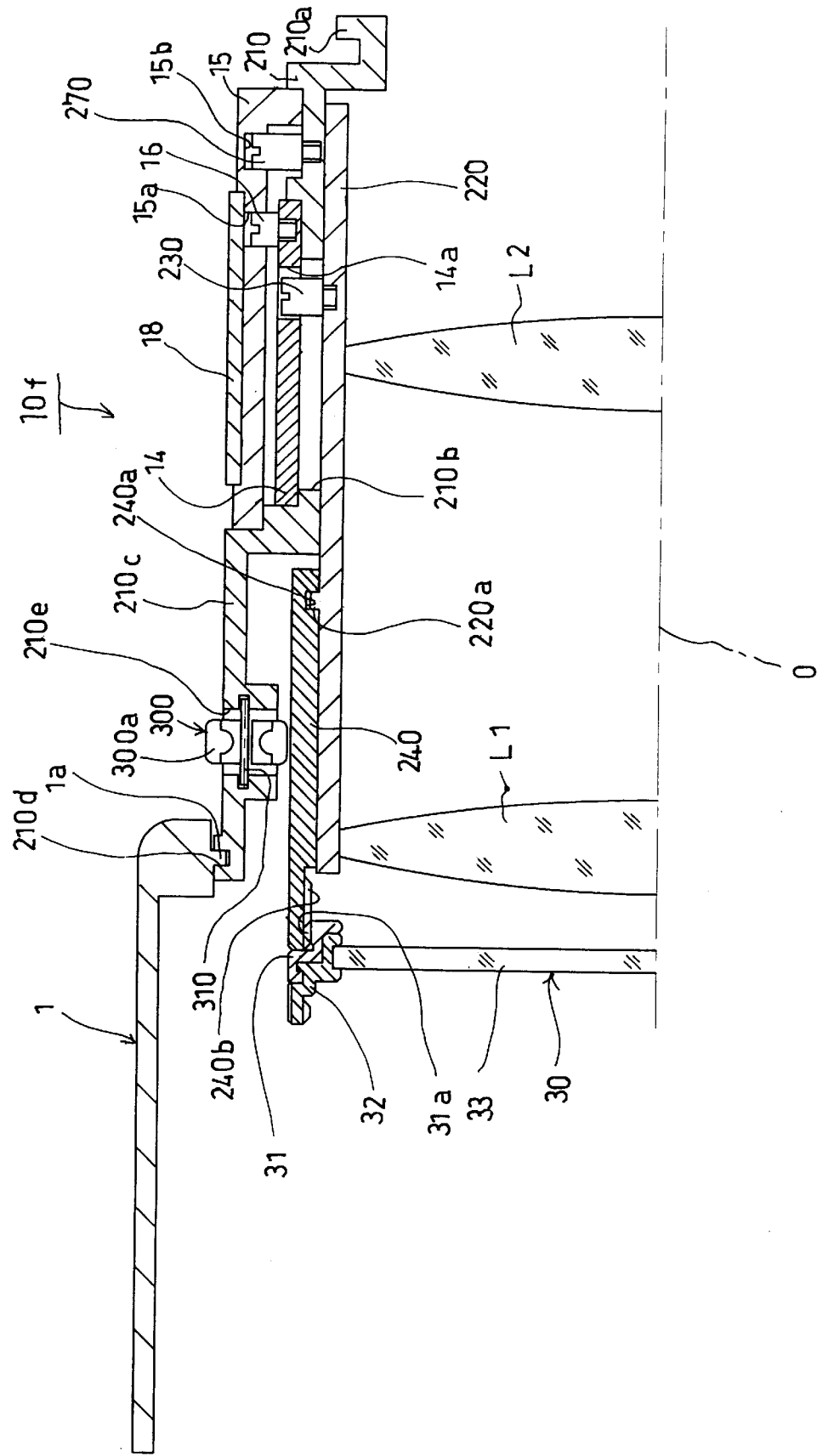
FIG. 13 is a cross-sectional view of the seventh embodiment of a lens barrel to which the present invention is applied, in a state where the focal point is set at infinity, showing an upper half of the lens barrel from the optical axis thereof.
Figure 14:
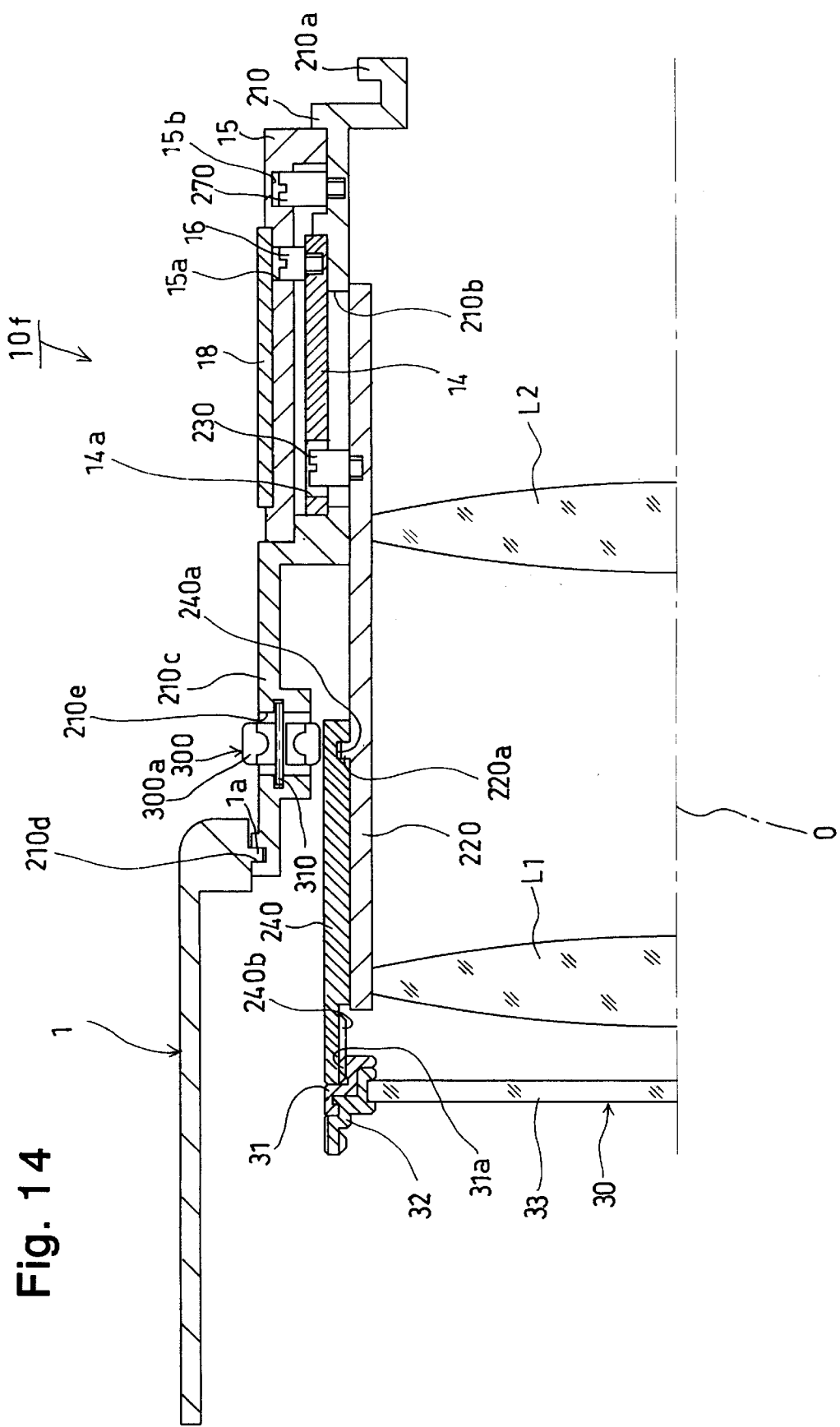
FIG. 14 is a cross-sectional view of the seventh embodiment of the lens barrel shown in FIG. 13 in a state where the focal point is set at the minimum distance, showing an upper half of the lens barrel from the optical axis thereof.

FIGS. 13 and 14 show the seventh embodiment of a lens barrel to which the present invention is applied. FIG. 13 shows the lens barrel in a state where the focal point is set at infinity (∞), while FIG. 14 shows the lens barrel in a state where the focal point is set at a minimum distance. In the seventh embodiment of the lens barrel 10f, the user can rotate the circular polarizing filter 33 by rotating an operational roller 300 by his or her finger F while depressing the operational roller 300 towards the inside of the Lens barrel 10ƒ. The operational roller 300 is rotatably supported by a stationary barrel 210.

The lens barrel 10ƒ is provided with the stationary barrel 210 having a mount ring 210*a* at the rear end thereof. The mount ring 210*a* is connected to a corresponding mount ring of a camera body (not shown) to fix the lens barrel 10ƒ to the camera body. The lens barrel 10ƒ is further provided with a movable barrel 220. Rear portion of the movable barrel 220 is fitted in the stationary barrel 210 so that the movable barrel 220 is movable along an optical axis O relative to the stationary barrel 210. The first and second lens groups L1 and L2 are fixed to the movable barrel 220 to be positioned therein.

The movable barrel 220 is provided on the outer peripheral surface thereof with a plurality of follower pins 230 (only one of them is shown in each of FIGS. 13 and 14) each projecting outwardly in a radial direction. The plurality of follower pins 230 are slidably fitted in a corresponding plurality of linear guide slots 210*b* (only one of them is shown in each of FIGS. 13 and 14) formed on the stationary barrel 210, respectively. Each guide slot 210*b* extends in the direction of the optical axis O. Accordingly, the movable barrel 220 is guided in the direction of the optical axis O to be movable relative to the stationary barrel 210 by a linear guide mechanism including the follower pins 230 and the linear guide slots 210*b*.

A cam ring 14 is fitted on the outer peripheral surface of the stationary barrel 210 to be immovable in the direction of the optical axis O and rotatable about the optical axis O relative to the stationary barrel 210. The cam ring 14 is provided with a plurality of cam slots 14*a* (only one of them is shown in each of FIGS. 13 and 14) in which the tips of the follower pins 230 are fitted, respectively. Accordingly, rotating the cam ring 14 relative to the stationary barrel 210 causes the movable barrel 220 to move in the direction of the optical axis O via the plurality of follower pins 230, each of which is engaged with the corresponding linear guide slot 210*b* and the corresponding cam slot 14*a* at the same time.

The lens barrel 10ƒ is further provided with a focusing ring 15 fitted on the stationary barrel 210 with the cam ring 14 being positioned between the stationary barrel 210 and the focusing ring 15. The focusing ring 15 is provided on the inner peripheral surface thereof with a hole 15*a* in which a pin 16 fixed on the outer peripheral surface of the cam ring 14 is fitted. The focusing ring 15 is further provided, on the inner peripheral surface thereof behind the hole 15*a*, with a circumferential groove 15*b* which extends circumferentially over a predetermined angular range. A plurality of pins 270 (only one of them is shown in each of FIGS. 13 and 14) which are fixed on the outer peripheral surface of the stationary barrel 210 are fitted in the circumferential groove 15*b*.

Accordingly, the focusing ring 15 is rotatable about the optical axis O relative to the stationary barrel 210 within a predetermined rotational range corresponding to the circumferential length of the circumferential groove 15*b*. Rotating the focusing ring 15 causes the cam ring 14 to rotate together with the focusing ring 15 since the pin 16 is fitted in the hole 15*a*. A rubber ring 18 is fixed onto the outer peripheral surface of the focusing ring 15. When operating the focusing ring 15, the user holds the rubber ring 18 to rotate the focusing ring 15.

The stationary barrel 210 is provided at the front thereof with an expanded cylindrical portion (outer barrel) 210*c* whose inner diameter is greater than the outer diameter of the middle portion of the stationary barrel 210 on which the linear guide slots 210*b* is formed. The expanded cylindrical portion 210*c* is provided, on the outer peripheral surface at the front end thereof, with a circumferential groove (lens-hood mount portion) 210*d* which is engaged with the plurality of engaging projections 1*a* (only one of them is shown in each of FIGS. 13, 14 and 15) of the lens hood 1. The expanded cylindrical portion 210*c* is provided behind the circumferential groove 210*d* with a rectangular operational roller opening 210*e* in which the operational roller 300 is rotatably positioned.

The operational roller 300 is fitted on an axial shaft 310 which extends in the direction of the optical axis O. The respective ends of the axial shaft 310 are supported in the operational roller opening 210*e* by corresponding portions of the expanded cylindrical portion 210*c*. Outer peripheral part of the operational roller 300 is formed as a rubber ring portion 300*a* which projects radially out of the inner and outer peripheral surfaces of the expanded cylindrical portion 210*c*.

The lens barrel 10ƒ is provided between the expanded cylindrical portion 210*c* and the movable barrel 220 with a filter mount ring (inner barrel) 240. The filter mount ring 240 is fitted on the front of the movable barrel 220 to be rotatable about the optical axis O relative to the movable barrel 220. The filter mount ring 240 is provided, on the inner peripheral surface in the vicinity of the rear end thereof, with a circumferential groove 240*a* in which an outer flange 220*a* formed on the outer peripheral surface of the movable barrel 220 is fitted. Accordingly, the filter mount ring 240 is rotatable about the optical axis O relative to the movable barrel 220 and is immovable in the direction of the optical axis O relative to the movable barrel 220. The filter mount ring 240, the operational roller 300, the axial shaft 310, and the operational roller opening 210*e* constitute a filter adjustment mechanism (manual rotation structure).

The filter mount ring 240 is provided, on the inner peripheral surface at the front end thereof, with a female threaded portion (filter mount portion) 240*b*. A conventional screw-setting circular polarizing filter 30 is screwed on the female threaded portion 240*b*.

Figure 23:
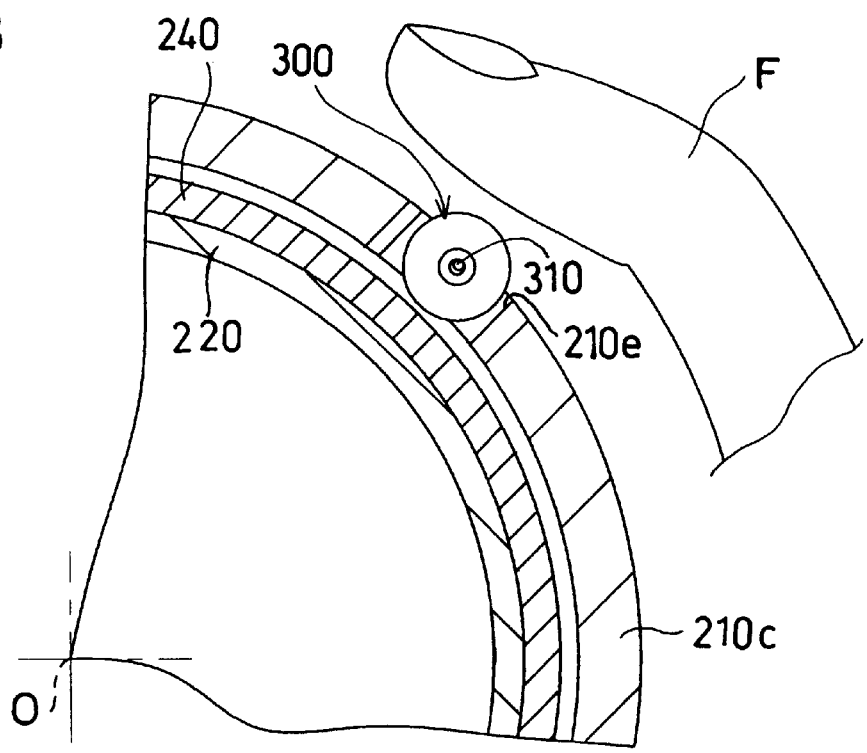
FIG. 23 is a cross-sectional view of part of the seventh embodiment of the lens barrel shown in FIG. 13, showing a state immediately before the user rotates an operational roller with his or her finger.

The outer peripheral surface of the operational roller 300, i.e., the outer peripheral surface of the rubber ring 300*a*, is separated slightly from the outer peripheral surface of the filter mount ring 240 to form a slight gap therebetween when in a free state (i.e., a non-operated state shown in FIGS. 13, 14 and 23). The axial shaft 310 is made of spring steel (resilient material), so that the axial shaft 310 is bent inwardly towards the optical axis O if the operational roller 300 is depressed by a finger F of the user (see FIGS. 15 and 24).

Figure 15:
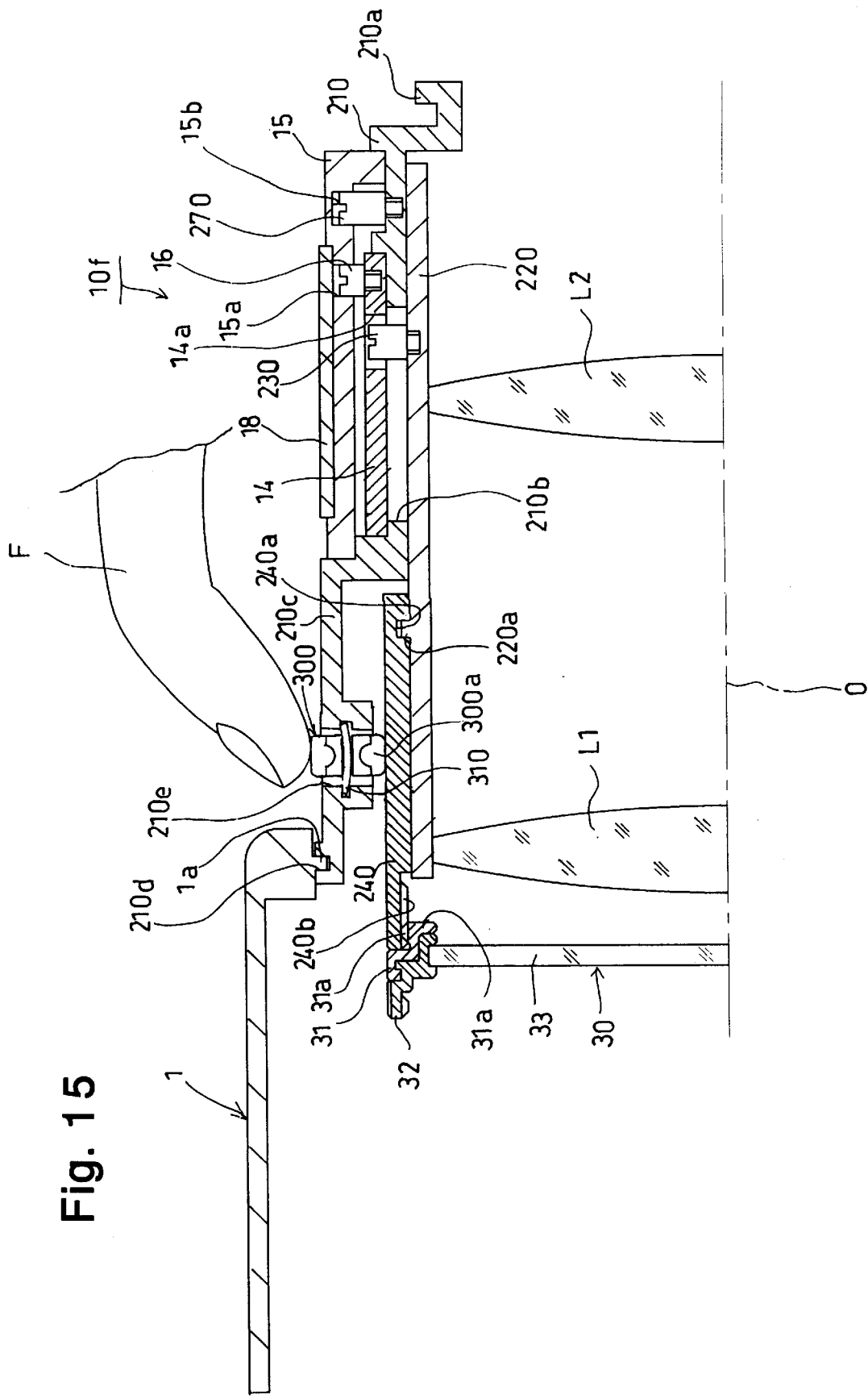
FIG. 15 is an explanatory view of the seventh embodiment of the lens barrel shown in FIG. 13, showing a state where the user rotates an operational roller with his or her finger.
Figure 24:
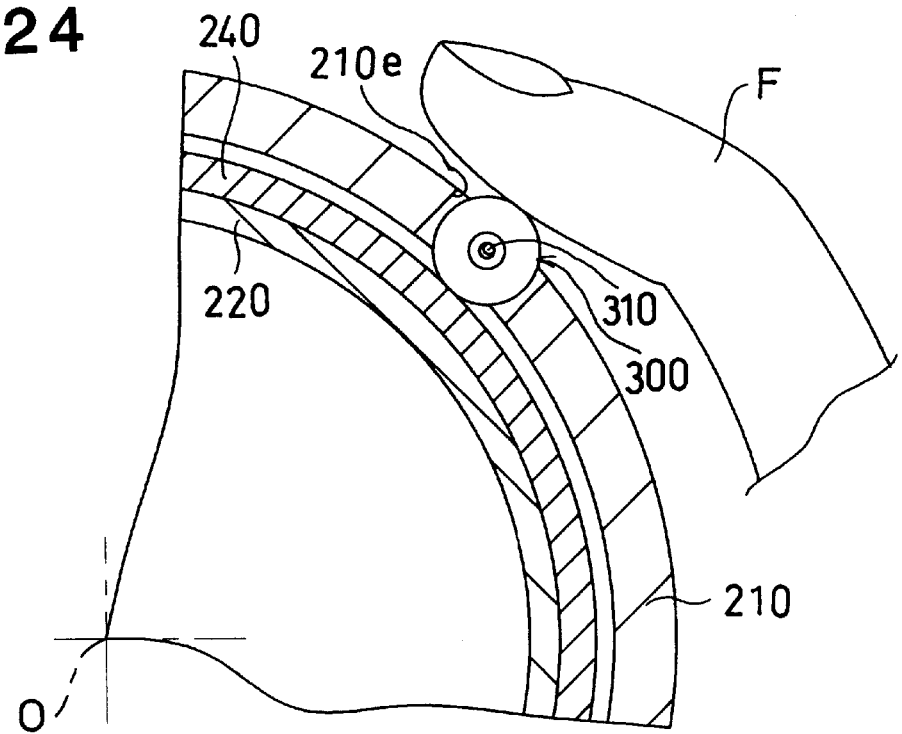
FIG. 24 is a cross-sectional view of the part of the lens barrel shown in FIG. 23, showing a state where the user is rotating the operational roller with his or her finger.

As shown in FIGS. 15 and 24, depressing the operational roller 300 by the finger F to bend the axial shaft 310 causes the outer peripheral surface of the operational roller 300 (i.e., the outer peripheral surface of the rubber ring 300*a*) to come into contact with the outer peripheral surface of the filter mount ring 240. Accordingly, if the user manually rotates the operational roller 300 by the finger F while depressing the operational roller 300 at the same time, the filter mount ring 240 rotates, so that the circular polarizing filter 33 rotates.

In other words, the operational roller 300 is movable between a transmission position (FIGS. 15 and 24) wherein the outer peripheral surface thereof contacts the outer peripheral surface of the filter mount ring 240, and a non-transmission position (FIGS. 13, 14 and 23) wherein the outer peripheral surface of thereof is separated from the outer peripheral surface of the filter mount ring 240.

The operation of the lens barrel 10f will be hereinafter discussed. Rotating the focusing ring 15 when the lens barrel 10f is in the state shown in FIG. 13 (i.e., in a state where the focal point of the lens barrel 10f is set at infinity) in a predetermined forward rotational direction by manually rotating the rubber ring 18 causes the cam ring 14 to rotate together with the focusing ring 15 in the same rotational direction via the pin 16 and the hole 15a. Subsequently, rotation of the cam ring 14 causes the follower pins 230, which are respectively fitted in the cam slots 14a, to advance in the direction of the optical axis O along the contours of the cam slots 14a. At the same time, the movable barrel 220 advances in the direction of the optical axis O since the follower pins 230 are guided linearly in the direction of the optical axis O by the linear guide slots 210b, respectively.

Accordingly, rotating the focusing ring 15 in the forward rotational direction thereof causes the movable barrel 220 to advance in the direction of the optical axis O, which moves the focal point of the photographic optical system (including the first and second lens groups L1 and L2) towards the minimum distance side. Further rotating the focusing ring 15 in the forward rotational direction thereof results in the lens barrel 10f attaining the state shown in FIG. 14, i.e., the focal point is set at the minimum distance.

Rotating the focusing ring 15 when the lens barrel 10f is in the state shown in FIG. 14 in the reverse rotational direction by manually rotating the focusing ring 15 causes the movable barrel 220 to retreat in the direction of the optical axis O, which moves the focal point of the photographic optical system towards the side of infinity. Further rotating the focusing ring 15 in the reverse rotational direction thereof causes the lens barrel 10f to return to the state shown in FIG. 13, i.e., the focal point is set at infinity.

When desiring to adjust the angle of rotation of the circular polarizing filter 33, the user has only to operate the operational roller 300 (part of which projects out of the operational roller opening 210e) while depressing the operational roller 300 at the same time by the finger F of the user. Accordingly, if the user manually rotates the operational roller 300, the filter mount ring 240 rotates together with the circular polarizing filter 33, which is attached to the front end of the filter mount ring 240. Hence, according to the seventh embodiment of the lens barrel 10f, the circular polarizing filter 33 can be easily rotated even with the lens hood 1 attached to the lens barrel 10f.

Furthermore, according to the seventh embodiment of the lens barrel 10f, the position of a holding part of the lens barrel 10f, which is held by hand of the user when the rotatable operational portion (i.e., the operational roller 300) is operated, is constant since the rotatable operational portion does not move in the direction of the optical axis O relative to the stationary barrel 210 even if the focal point is varied by operating the focusing ring 15. This facilitates the handling of the lens barrel.

Figure 16:
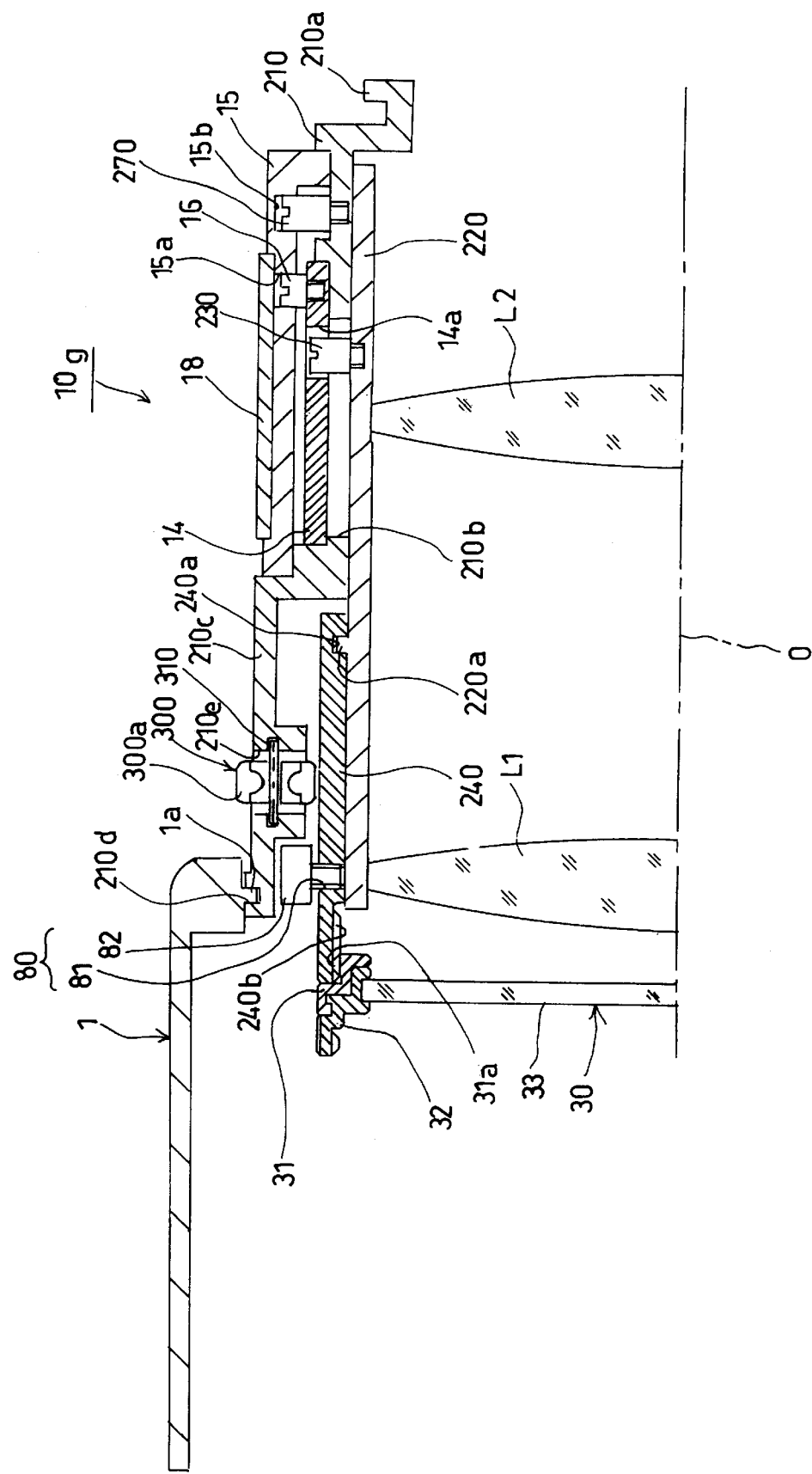
FIG. 16 is a cross-sectional view of the eighth embodiment of a lens barrel to which the present invention is applied, in a state where the focal point is set at infinity, showing an upper half of the lens barrel from the optical axis thereof.
Figure 17:
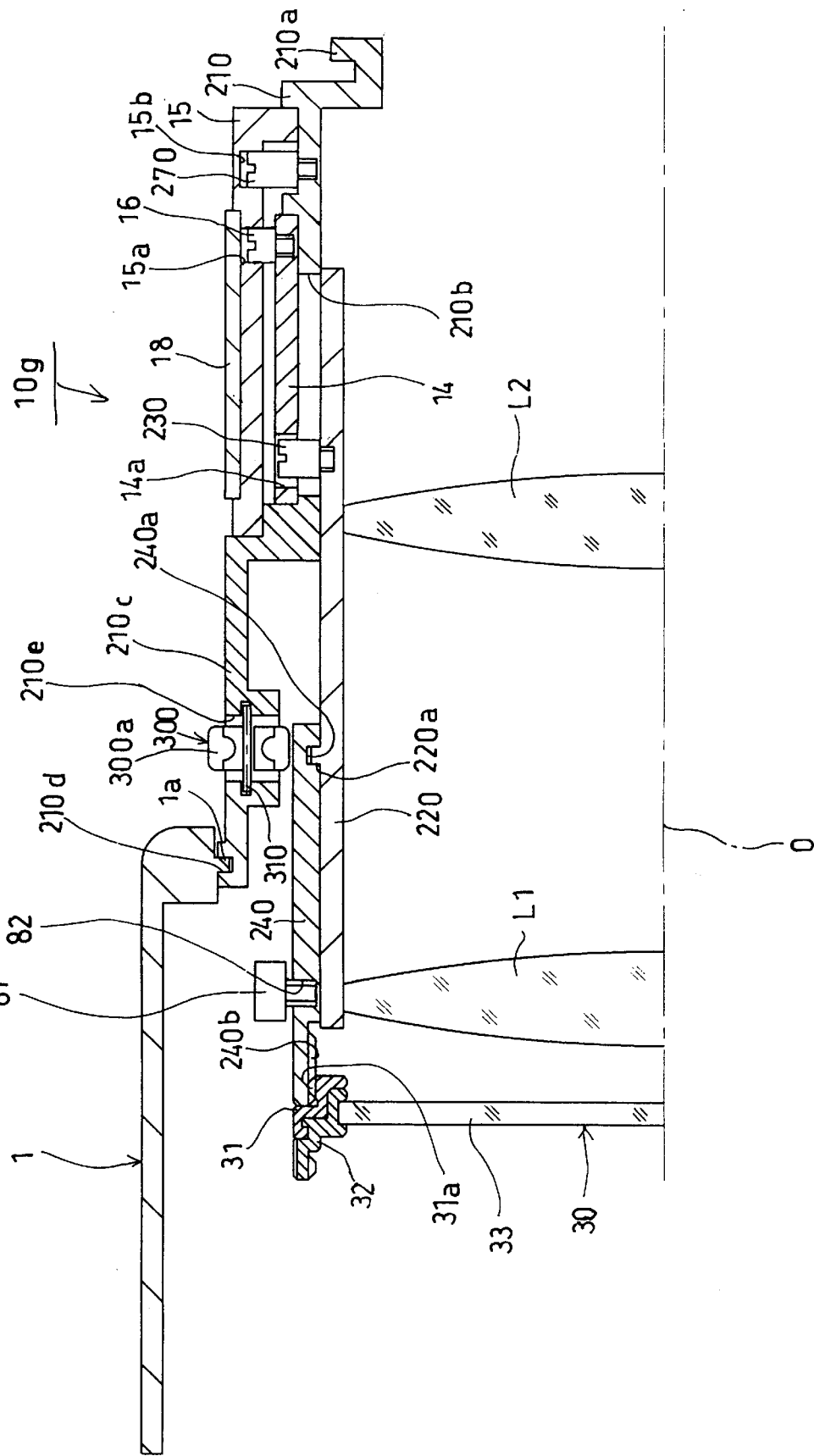
FIG. 17 is a cross-sectional view of the eighth embodiment of the lens barrel shown in FIG. 16 in a state where the focal point is set at the minimum distance, showing an upper half of the lens barrel from the optical axis thereof.

FIGS. 16 and 17 show the eighth embodiment of a lens barrel 10 to which the present invention is applied. FIG. 16 shows the lens barrel in a state where the focal point is set at infinity (∞), while FIG. 17 shows the lens barrel in a state where the focal point is set at a minimum distance. A female screw hole 81 is formed on the filter mount ring 240 to extend in a radial direction, while a lock screw nut 82 is screwed in the female screw hole 81. The eighth embodiment of the lens barrel 10g is the same as the seventh embodiment of the lens barrel 10f except that the lens barrel 10g is further provided with a rotatable operational ring lock mechanism (lock mechanism) 80 which includes the female screw hole 81 and the lock screw nut 82.

Figure 18:
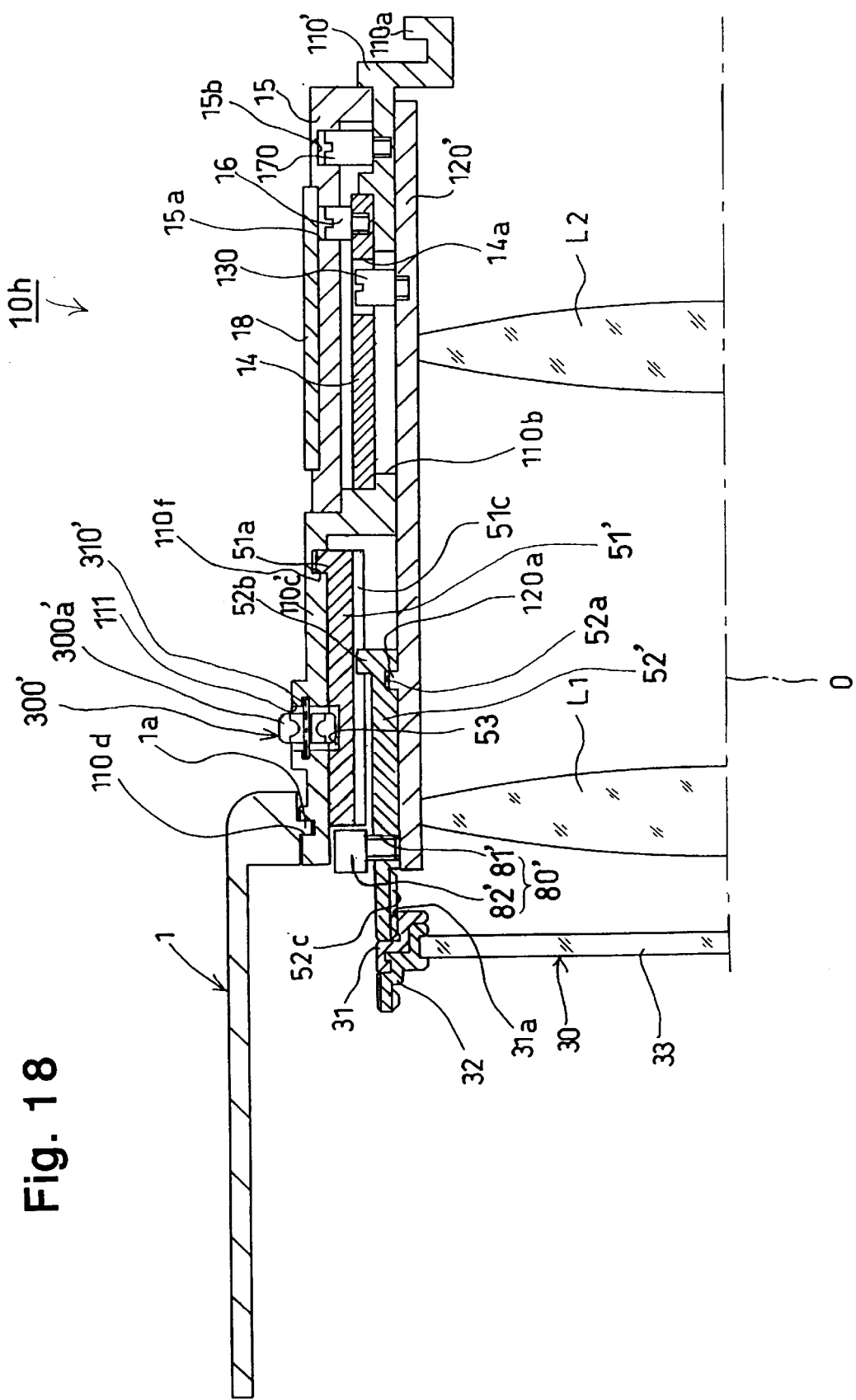
FIG. 18 is a cross-sectional view of the ninth embodiment of a lens barrel to which the present invention is applied, in a state where the focal point is set at infinity, showing an upper half of the lens barrel from the optical axis thereof.
Figure 19:
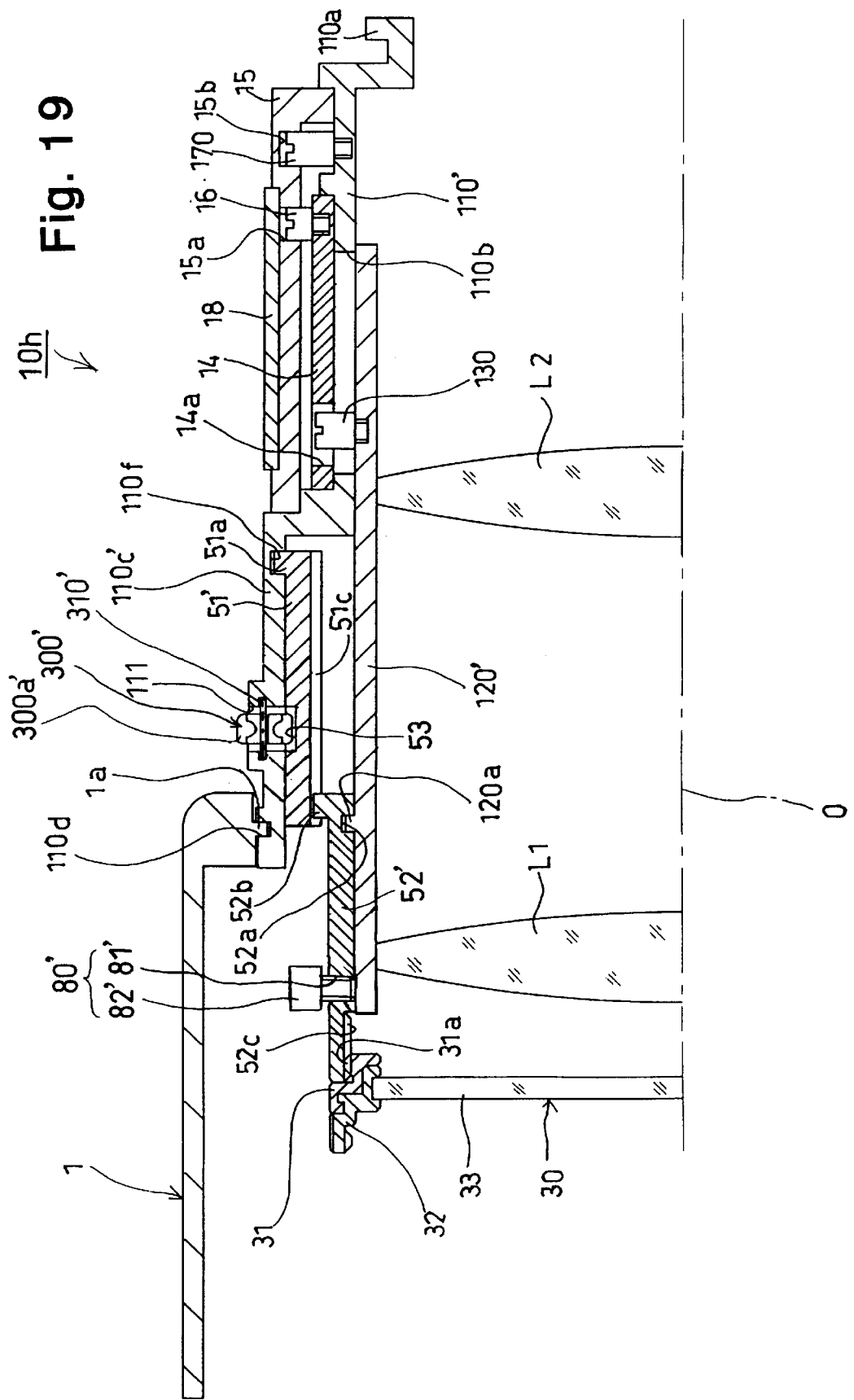
FIG. 19 is a cross-sectional view of the ninth embodiment of the lens barrel shown in FIG. 18 in a state where the focal point is set at the minimum distance, showing an upper half of the lens barrel from the optical axis thereof.

FIGS. 18 and 19 show the ninth embodiment of a lens barrel to which the present invention is applied. FIG. 18 shows the lens barrel in a state where the focal point is set at infinity (∞), while FIG. 19 shows the lens barrel in a state where the focal point is set at a minimum distance. Similar to the fifth embodiment, a stationary barrel 1101 of the lens barrel 10h is provided at the front thereof with an expanded cylindrical portion (outer barrel) 110c', and the lens barrel 10h is provided between the expanded cylindrical portion 110c' and a movable barrel 120' with a rotatable operational ring (middle barrel) 51' and a filter mount ring (inner barrel) 52' which rotates together with the circular polarizing filter 33.

The expanded cylindrical portion 110c' is provided with a rectangular operational roller opening 111 in which a operational roller 300' is rotatably positioned. The operational roller 300' is fitted on an axial shaft 310' which extends in the direction of the optical axis O. The respective ends of the axial shaft 310' are supported in the operational roller opening 111 by corresponding portions of the expanded cylindrical portion 110c'. Outer peripheral part of the operational roller 300' is formed as a rubber ring portion 300a' which projects radially out of the inner and outer peripheral surfaces of the expanded cylindrical portion 110c'.

The rotatable operational ring 51' is provided on the outer peripheral surfaces thereof with a circumferential annular groove 53. The outer peripheral surface of the operational roller 300', i.e., the outer peripheral surface of the rubber ring 300a', is separated slightly from the bottom surface of the circumferential annular groove 53 when in a free state (non-operated state).

The axial shaft 310' is made of spring steel (resilient material), so that the axial shaft 310' is bent inwardly towards the optical axis O if the operational roller 300' is depressed by a finger of the user.

Depressing the operational roller 300' to bend the axial shaft 310' causes the outer peripheral surface of the operational roller 300' to come into contact with the bottom surface of the circumferential annular groove 53. Accordingly, if the user manually rotates the operational roller 300' by the finger while depressing the operational roller 300' at the same time, the rotatable operational ring 51' rotates. Rotating the rotatable operational ring 51' by operating the operational roller 300' causes the filter mount ring 52 to rotate together with the rotational operational ring 51' in the same rotational direction, to thereby rotate the circular polarizing filter 33.

The ninth embodiment of the lens barrel 10h is the same as the fifth embodiment of the lens barrel 10d except that a filter adjustment mechanism (manual rotation structure) of the lens barrel 10h includes the operational roller opening 111, the operational roller 300', the axial shaft 310' and the circumferential annular groove 53 in place of the knurled operational surface portion 51b and the operational opening 110e.

Note that the lens barrel 10h is further provided with a rotatable operational ring lock mechanism (lock mechanism) 80' which includes the female screw hole 81' formed on the filter mount ring 52', and the lock screw nut 82' which is screwed in the female screw hole 81'.

In each of the first through ninth embodiments, although the screw-setting circular polarizing filter 30, which includes a mount ring 31 and a rotatable filter ring 32, is attached to the filter mount portion (21b, 52c or 240b), another filter whose filter supporting ring is screwed directly in the filter mount portion can also be attached to the filter mount portion.

In each of the third, fourth, seventh, eighth and ninth embodiments, although the outer peripheral part of the operational roller (43, 300 or 300') is formed as a rubber ring portion (43a, 300a or 300a'), a similar effect can be expected if only at least the outer peripheral surface (thin layer) of the operational roller is made of a friction-enhancing material such as rubber.

In each of the third, fourth, seventh, eighth and ninth embodiments, although the operational roller (43, 300 or 300') is adopted as a rotary operational member for rotating the circular polarizing filter 33, the present invention is not limited solely to this structure. For instance, a pinion gear can be used instead of the operational roller (43, 300 or 300'), wherein a circumferential gear portion (or splined portion) which is engaged with the pinion gear is formed on the outer peripheral surface of the inner barrel (the rotatable operational ring 21, the filter mount ring 240 or the filter mount ring 52'). In this case a similar effect can be expected.

In each of the first through ninth embodiments, although the screw-setting circular polarizing filter 30 having the circular polarizing filter 33 is attached to the filter mount portion (21b, 52c or 240b), a screw-setting filter having any other type of filter than the circular polarizing filter 33 (e.g., a standard polarizing filter) can also be attached to the filter mount portion.

In each of the first through ninth embodiments, the screw-mounting structure of the filter mount portion (21b, 52c or 240b) can be replaced by any other type of filter mounting structure, e.g., a conventional mounting structure of bayonet mount.

In each of the first through ninth embodiments, although the present invention is applied to the lens barrel having a fixed focal length, the present invention can also be applied to a zoom lens barrel offering a range of focal lengths. Specifically if the structure characteristic of the present invention in each of the fifth through ninth embodiments is applied to a zoom lens barrel, the position of a holding part of the zoom lens barrel, which is held by hand of the user when the rotatable operational portion is operated, is constant since the rotatable operational portion does not move in the direction of the optical axis O relative to the stationary barrel 110, 210 and 110' even if the lens barrel is largely extended to effect zooming to thereby change the axial position of the filter mount portion. This facilitates the handling of the lens barrel.

The present invention can be applied to not only an interchangeable lens barrel for SLR cameras but also a lens barrel which is integrally formed on a camera body. Furthermore, the present invention can be applied to not only a lens barrel for cameras, but also to a lens barrel for any other types of optical instruments.

As can be understood from the foregoing, according to the present invention, a filter which is attached to the front end of the lens barrel can be easily rotated even with a lens hood attached to the lens barrel, which facilitates the handling of the lens barrel.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A lens barrel comprising:
   an outer barrel comprising a lens-hood mount portion at the front end of said outer barrel, a lens hood being detachably attached to said lens-hood mount portion;
   an inner barrel comprising a filter mount portion at the front end of said inner barrel, said inner barrel being positioned inside said outer barrel to be rotatable about an optical axis relative to said outer barrel; and
   a manual rotation structure adapted to rotate said inner barrel from the outside of said outer barrel.

2. The lens barrel according to claim 1, wherein said manual rotation structure comprises an operational opening formed on said outer barrel to radially expose part of an outer peripheral surface of said inner barrel through said operational opening.

3. The lens barrel according to claim 2, wherein said exposed part of said outer peripheral surface of said inner barrel is knurled.

4. The lens barrel according to claim 1, wherein said manual rotation structure further comprises an operational roller which is rotatably supported by an axial shaft supported by said outer barrel so that an outer peripheral surface of said roller contacts an outer peripheral surface of said inner barrel, said operational roller being operated from the outside of said outer barrel.

5. The lens barrel according to claim 4, wherein said manual rotation structure comprises an operational opening formed on said outer barrel; and
   wherein said operational roller is positioned in said operational opening.

6. The lens barrel according to claim 4, wherein at least an outer peripheral surface of said operational roller is comprised of a friction-enhancing material.

7. The lens barrel according to claim 6, wherein said friction-enhancing material comprises rubber.

8. The lens barrel according to claim 6, wherein said axial shaft is comprised of a resilient material so that said operational roller is movable between a transmission position wherein said outer peripheral surface of said operational roller contacts said outer peripheral surface of said inner barrel, and a non-transmission position wherein said outer peripheral surface of said operational roller is separated from said outer peripheral surface of said inner barrel.

9. The lens barrel according to claim 8, wherein said resilient material is spring steel.

10. The lens barrel according to claim 1, further comprising a middle barrel positioned between said outer barrel and said inner barrel to be rotatable about said optical axis relative to said outer barrel; wherein said manual rotation structure comprises:
    an operational opening formed on said outer barrel to radially expose part of an outer peripheral surface of said middle barrel through said operational opening; and
    a rotation transmitting device for transmitting rotation of said middle barrel to said inner barrel.

11. The lens barrel according to claim 10, wherein said exposed part of said outer peripheral surface of said middle barrel is knurled.

12. The lens barrel according to claim 10, wherein said middle barrel is positioned between said outer barrel and said inner barrel to be immovable in the direction of said optical axis relative to said outer barrel.

13. The lens barrel according to claim 10, wherein said rotation transmitting device comprises:

at least one linear guide groove formed on an inner peripheral surface of said middle barrel to extend in the direction of said optical axis; and at least one corresponding projection projecting radially from an outer peripheral surface of said inner barrel to be fitted in said at least one linear guide groove.

14. The lens barrel according to claim 1, further comprising a middle barrel positioned between said outer barrel and said inner barrel to be rotatable about said optical axis relative to said outer barrel; wherein said manual rotation structure comprises:

a rotation transmitting device for transmitting rotation of said middle barrel to said inner barrel; and an operational roller which is rotatably supported by an axial shaft supported by said outer barrel so that an outer peripheral surface of said roller contacts an outer peripheral surface of said middle barrel, said operational roller being operated from the outside of said outer barrel.

15. The lens barrel according to claim 14, wherein said operational roller is positioned in an operational opening formed on said outer barrel.

16. The lens barrel according to claim 14, wherein at least an outer peripheral surface of said operational roller is comprised of a friction-enhancing material.

17. The lens barrel according to claim 16, wherein said friction-enhancing material comprises rubber.

18. The lens barrel according to claim 14, wherein said axial shaft is comprised of a resilient material so that said operational roller is movable between a transmission position wherein said outer peripheral surface of said operational roller contacts said outer peripheral surface of said middle barrel, and a non-transmission position wherein said outer peripheral surface of said operational roller is separated from said outer peripheral surface of said middle barrel.

19. The lens barrel according to claim 18, wherein said resilient material is spring steel.

20. The lens barrel according to claim 1, further comprising a lock mechanism which locks said inner barrel so as not to rotate about said optical axis relative to said outer barrel.

21. The lens barrel according to claim 20, wherein said lock mechanism comprises:

a female screw hole formed on said outer barrel; and a lock screw nut screwed in said female screw hole.

22. The lens barrel according to claim 1, wherein said filter mount portion comprises a female threaded portion on which a male thread portion formed on a filter mount ring is screwed.

23. The lens barrel according to claim 1, wherein one of a polarizing filter and a circular polarizing filter is attached to said filter mount portion.

24. The lens barrel according to claim 1, further comprising:

a stationary barrel which is fixedly attached to a body of an optical instrument; and a movable barrel fitted in said stationary barrel so that said movable barrel is movable along said optical axis relative to said stationary barrel.

25. The lens barrel according to claim 24, wherein said outer barrel is formed integral with said stationary barrel.

26. The lens barrel according to claim 24, wherein said outer barrel is formed integral with said movable barrel.

27. A lens barrel comprising:

an outer barrel to which a lens hood is detachably attached at the front end thereof;

a rotatable barrel comprising a filter mount portion at the front end thereof, said rotatable barrel being positioned inside said outer barrel to be rotatable about an optical axis relative to said outer barrel; and an operational opening formed on said outer barrel to radially expose part of an outer peripheral surface of said rotatable barrel through said operational opening, so that rotating force is applied to the rotatable barrel through said opening by a user.

* * * * *